United States Patent [19]
Baba et al.

[11] Patent Number: 5,929,436
[45] Date of Patent: Jul. 27, 1999

[54] OPTICAL SENSOR INCLUDING A FIRST AND SECOND CONVERGING OPTICAL SYSTEM FOR EDGE DETECTION

[75] Inventors: Nobuyuki Baba, Yokohama; Toshiharu Murai, Kawasaki; Sumiaki Aoki; Koichi Kudo, both of Yokohama, all of Japan

[73] Assignee: Ricoh Company, Ltd., Tokyo, Japan

[21] Appl. No.: 08/912,368

[22] Filed: Aug. 18, 1997

Related U.S. Application Data

[62] Division of application No. 08/640,692, May 1, 1996, Pat. No. 5,729,024.

[30] Foreign Application Priority Data

| May 8, 1995 | [JP] | Japan | 7-109234 |
| Jul. 31, 1995 | [JP] | Japan | 7-194610 |
| Oct. 3, 1995 | [JP] | Japan | 7-255923 |
| Oct. 31, 1995 | [JP] | Japan | 7-283531 |
| Mar. 18, 1996 | [JP] | Japan | 8-60678 |

[51] Int. Cl.$^6$ .................................................... G01J 1/20
[52] U.S. Cl. ......................... 250/234; 250/236; 250/216; 359/17
[58] Field of Search .................................. 250/234–236, 250/216, 559.36; 359/17

[56] References Cited

U.S. PATENT DOCUMENTS

| 5,479,274 | 12/1995 | Baba . | |
| 5,594,242 | 1/1997 | Konishi et al. | 250/234 |
| 5,729,024 | 3/1998 | Baba et al. | 250/236 |

FOREIGN PATENT DOCUMENTS

| 50-119537 | 9/1975 | Japan . |
| 53-42576 | 11/1978 | Japan . |
| 59-2299-2 | 5/1984 | Japan . |
| 6-242391 | 9/1994 | Japan . |

*Primary Examiner*—Stephone B. Allen
*Attorney, Agent, or Firm*—Oblon, Spivak, McClelland, Maier & Neustadt, P.C.

[57] ABSTRACT

An original placement table is provided, on which an original sheet is placed. An original scanning device causes a light beam to scan the original sheet placed on the original placement table. A light receiving device receives a light beam which has been reflected by the original sheet placed on the original placement table after being emitted by the original scanning device. An original edge determining device monitors light intensity of the light beam received by the light receiving device. The original edge determining device determines that the light beam currently being received by the light receiving device is the light beam reflected by an edge of the original sheet placed on the original placement table when a significant variation is detected in the light intensity either for the first time or for the last time in one scanning operation of the original scanning device.

3 Claims, 22 Drawing Sheets

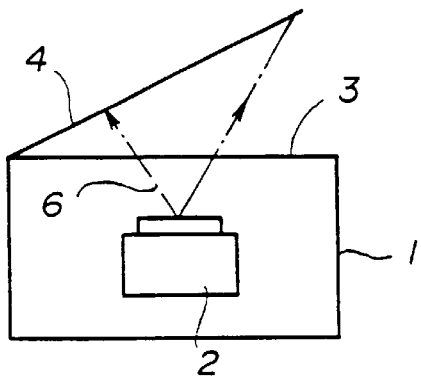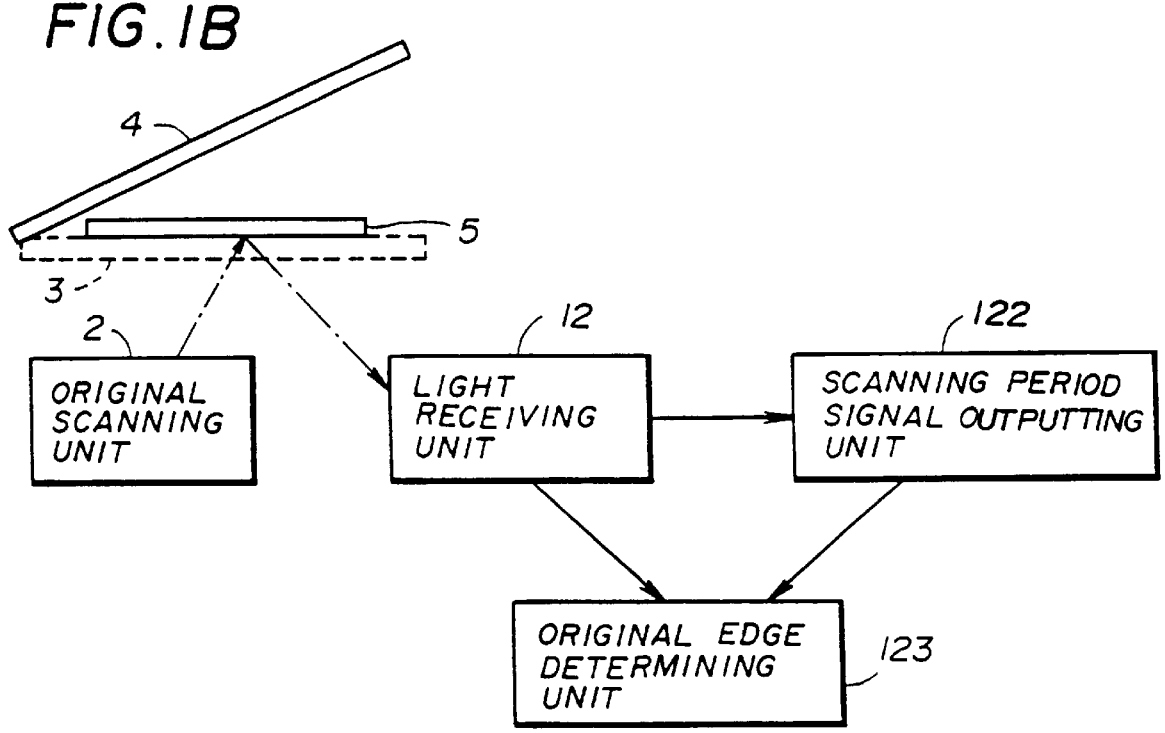

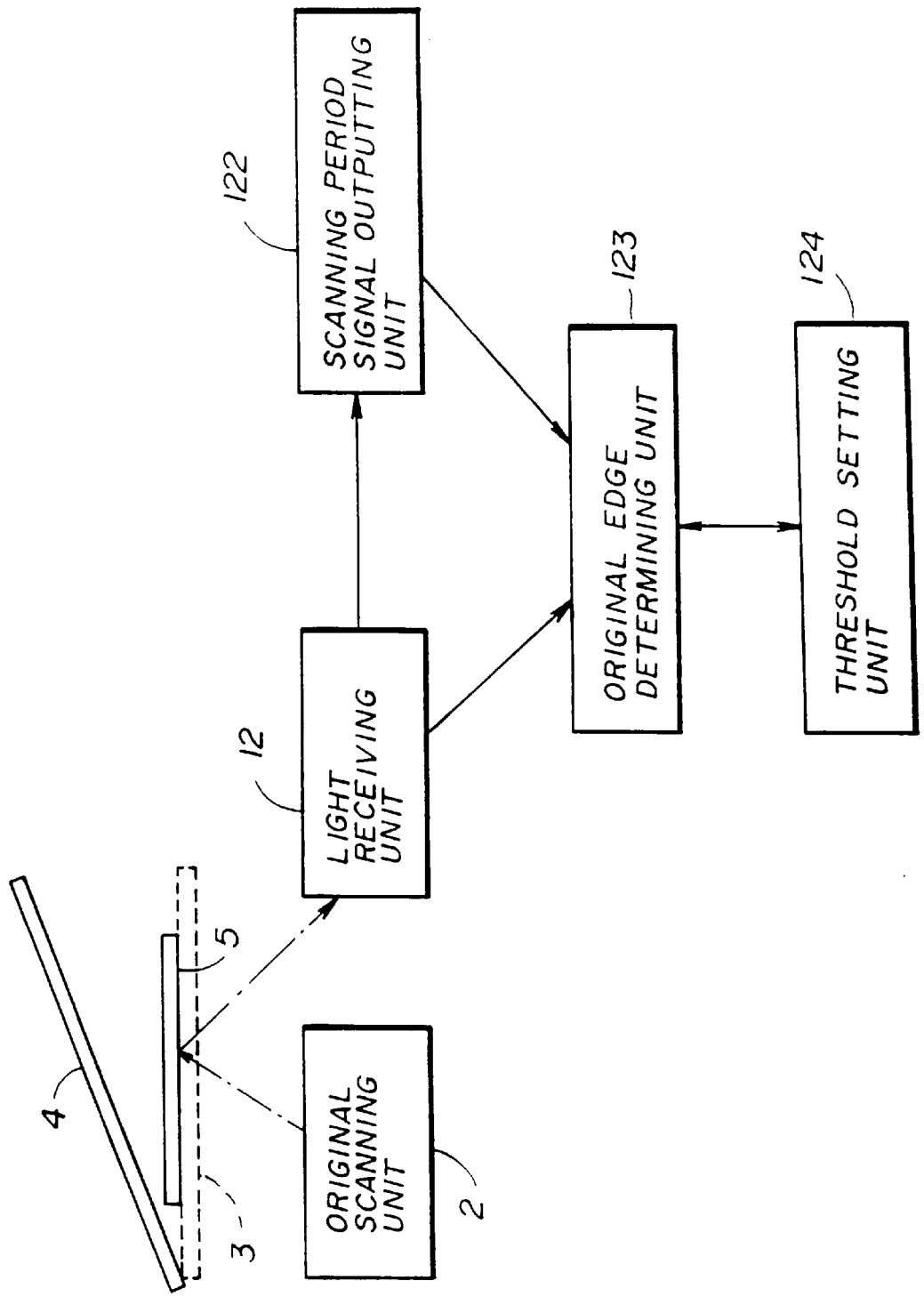

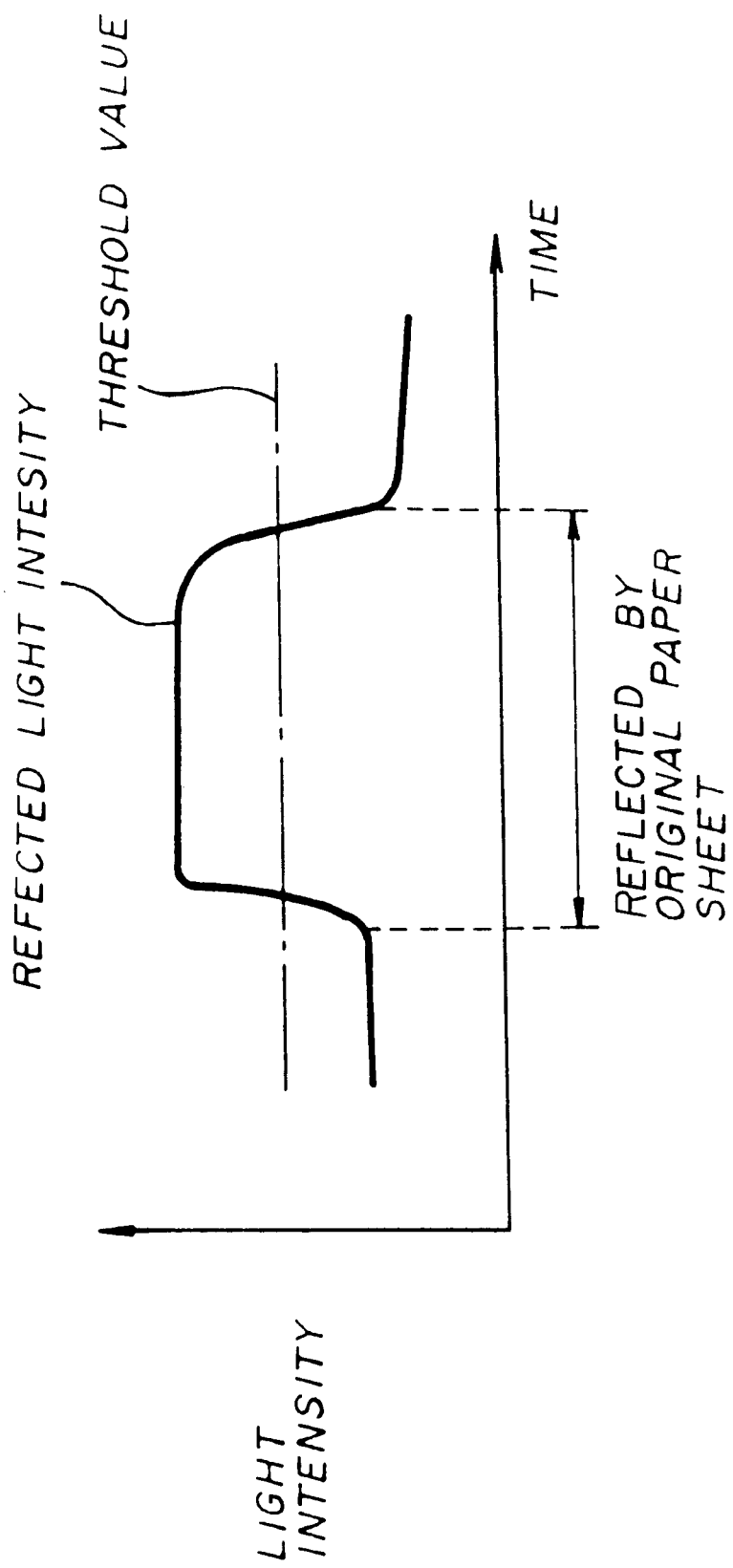

FIG. 16
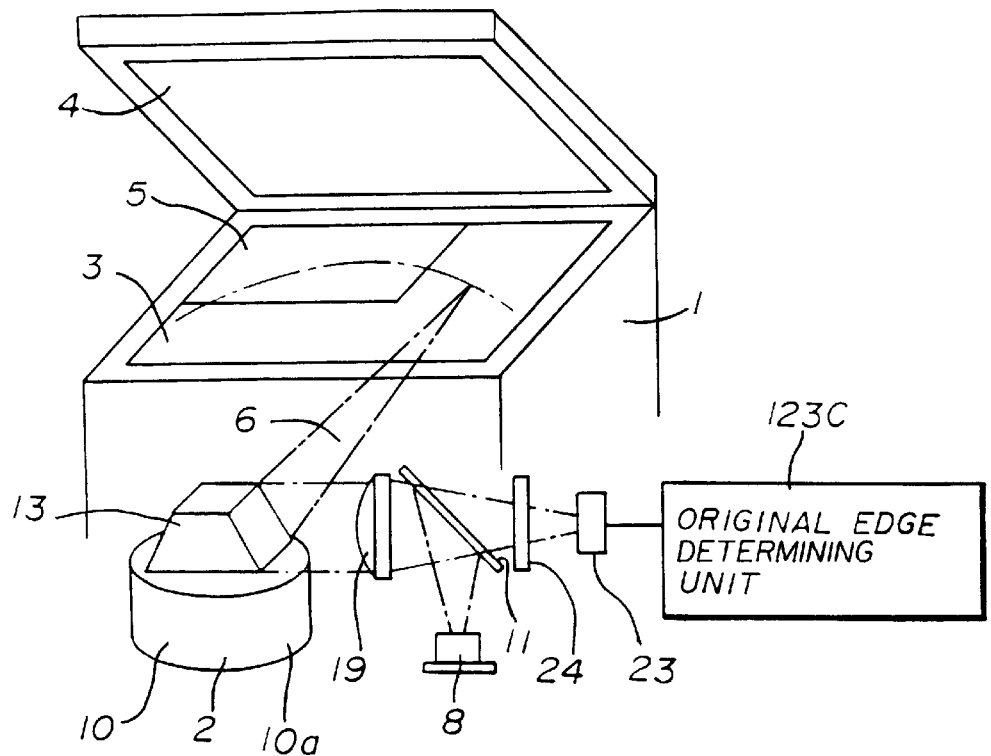
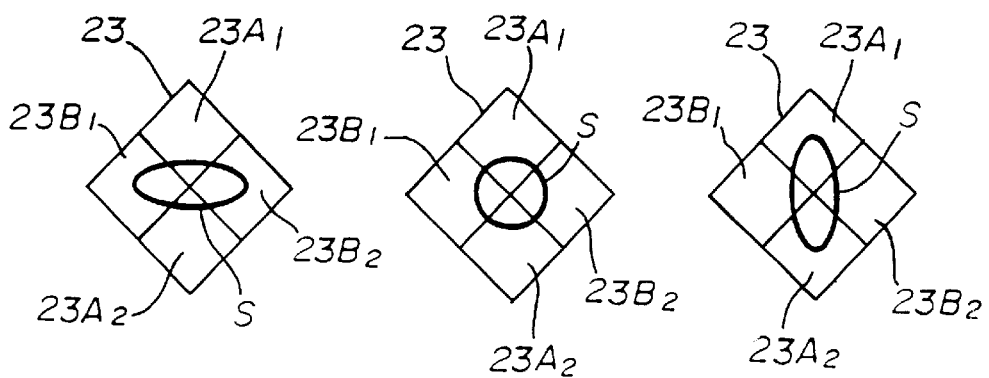
FIG. 17A    FIG. 17B    FIG. 17C

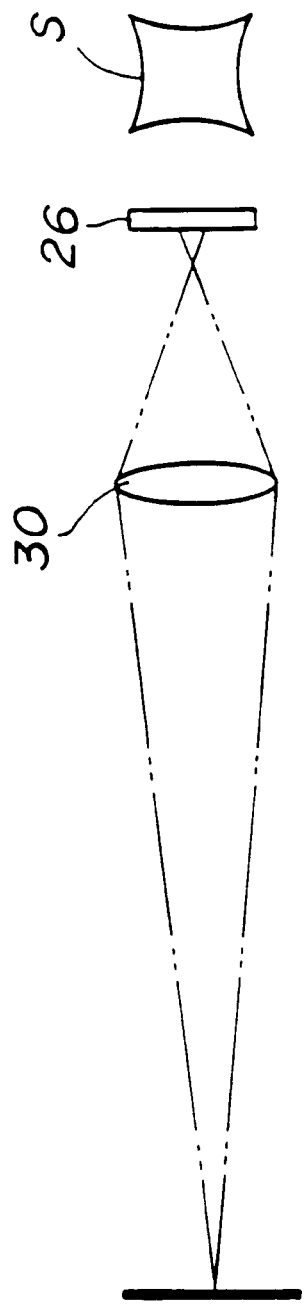

OPTICAL SENSOR INCLUDING A FIRST AND SECOND CONVERGING OPTICAL SYSTEM FOR EDGE DETECTION

This is a Division, of application Ser. No. 08/640,692 filed on May 1, 1996 now U.S. Pat. No. 5,729,024.

BACKGROUND OF THE INVENTION

1. Field of the Invention

The present invention relates to an original edge detecting system, in particular, to an original edge detecting system for detecting edges of an original paper sheet. The original paper sheet is a sheet of paper, optical information to be processed provided thereon, hereinafter.

Further, the present invention also relates to an optical sensor in which a light source emits light on a to-be-detected object, and light reflected by the to-be-detected object and passing through a retroreflection path is received. Such an optical sensor may be used in the above-mentioned original edge detecting system.

2. Description of the Related Art

The Japanese Patent Publication No.59-22992 discloses an information reading apparatus in which a laser beam is directed on a rotating hologram disc, forming scan lines, to scan an information carrier. Light reflected by the information carrier is detected through a photoelectric converter, and is converted into an electric signal. Thus, information carried by the information carrier is read. In the information reading apparatus, the photoelectric converter detects light from the information carrier, which light passes a hologram used in the scanning or another hologram having a focus at a position the same as the position of the focus of the hologram used in the scanning.

The Japanese Laid-Open Patent Application No.6-242391 discloses a light-scanning original reading apparatus having light scanning means for using light for scanning a surface of an original paper sheet, the scanning light being incident on and drawing scan lines on the surface of the original paper sheet; means for detecting light reflected and diffused by the surface of the original paper sheet; and means for calculating a size and a leaning angle of the original paper sheet from information indicating intensity of the detected light and positions of the scan lines.

The Japanese Laid-Open Patent Application No.50-119537 discloses an optical reading apparatus in which light from a light source scans a to-be-read part so as to result in scanning lines on the to-be-read part, which scanning lines on the to-be-read part cross each other, and light reflected by the to-be-read part and passing a path the same as a path which the light passed when it was incident on the to-be-read part is detected. Thus, information is read from the to-be-read part.

In the above-described information reading apparatus disclosed in the Japanese Patent Publication No.59-22992, it is considered that laser light is used for the scanning. Thereby, it is possible to obtain a very small spot diameter and therefore to read information with a high resolution. However, various images may be present on the original paper sheet. Further, a paper pressing sheet which is provided in the apparatus for pressing and thus holding the original paper sheet may have dirt adhering thereon. Therefore, it may be difficult to correctly detect an edge of the original paper sheet. This is because, when a light spot of the very small spot diameter is used, it may be difficult to distinguish light intensity variation occurring when the light spot passes the edge of the original paper sheet from light intensity variation occurring when the light spot passes the various images present in the paper sheet or from light intensity variation occurring when the light spot passes the dirt adhering on the paper pressing sheet. Therefore, erroneous detection of the edge of the original paper sheet may occur. As a result, size detection of an original paper sheet based on a result of the edge detection of the original paper sheet may include errors.

In other words, only using intensity variation of received light, it may be difficult to correctly determine whether the received light is light reflected by an original paper sheet or the paper pressing sheet, or other disturbance light.

Further, images present in the original paper sheet may be erroneously detected as the edge of the paper sheet. Thereby, detection of the edge of original paper sheet may be confused in the apparatus. In order to prevent such a problem due to the contents of the images present in the original paper sheet, a diameter of the scanning light spot may be a relatively larger one. It is possible to have a relatively larger beam-spot diameter. However, it is advantageous to instead use a light-emitting diode. In fact, when using laser light in a public-use apparatus, it is necessary to provide many safety devices so as to fulfill many safety regulations. Further, it is likely that a system using laser light is adversely affected by electric noise, driving of the system is relatively difficult, and the system is relatively costly.

A case may be considered in which a light-emitting diode is combined with the above-mentioned hologram in the information reading apparatus disclosed in the Japanese Patent Publication No.59-22992. However, in this case, light passing through the hologram may have a very long sectional shape due to diffusion occurring when an optical path is long. Thereby, resolution may be too low to perform an effective function. Thus, it may be difficult to apply a light-emitting diode, which is easy to handle, in the disclosed method.

In the above-described light-scanning original reading apparatus disclosed in Japanese Laid-Open Patent Application No.6-242391, light from the light source is used to scan the surface of the original paper sheet. Using an intensity of light reflected, it is distinguished whether the light is reflected by the paper sheet or by another surface. However, various images may be present on the original paper sheet, as mentioned above. As a result, there is a possibility that a sharp variation in light intensity occurring when the light scans an image present on the original paper sheet is erroneously recognized to be a sharp variation in light intensity occurring when the light scans an edge of the paper sheet.

Further, the above-described optical reading apparatus disclosed-in the Japanese Laid-Open Patent Application No.50-119537 uses laser light. Therefore, as described above, it is necessary to provide many safety devices, it is likely that a system using laser light is adversely affected by electric noise, and driving of the system costs much.

An optical sensor such as that mentioned above is used to detect a size and/or a position of an original paper sheet of a copying machine, for recognizing information provided on articles such as bar codes, for detecting articles in a factory, and so forth.

For example, the above-described light-scanning original reading apparatus disclosed in the Japanese Laid-Open Patent Application No.6-242391 uses an optical sensor using a semiconductor laser for producing a laser beam in the above-mentioned light scanning means in an optical sensor.

Further, the Japanese Patent Publication No.53-42576 discloses an optical reading apparatus using an optical sensor in which laser light emitted by a laser oscillator is caused to pass through a center of a mirror having an opening. Then, the light is used to scan a to-be-read part through a plurality of deflection mirrors. Then, light reflected by the to-be-read part and passing a path the same as a path which the light passed when it was used for the scanning is reflected by a rear surface of the mirror having the opening. The light reflected by the rear surface of the mirror having the opening is received by a photoelectric converter and converted into an electric signal. Thus, information of the to-be-read part is read.

As described above, laser light is used to scan a to-be-detected object in each of the above-mentioned optical sensors. A reason for using laser light is to reduce a spot diameter formed on a to-be-detected object. However, as mentioned above, in order to use laser light in a public-use apparatus, it is necessary to provide many safety devices for fulfilling many safety regulations. As a result, the apparatus is costly and has a large size.

In order to eliminate such problems, a laser light source in a light scanning system in the related art can be replaced with a point-light-source light-emitting diode having a diameter of a light-emitting area not longer than 0.05 mm for obtaining an appropriate scanning-beam diameter. However, there are few manufacturers which provide such point-light-source light-emitting diodes, and such point-light-source light-emitting diodes are costly in comparison to ordinary light-emitting diodes. Further, because frequencies which can be used in such point-light-source light-emitting diodes are limited, it is not possible to actually use them for the above-mentioned purpose. Because each of ordinary, non-expensive light-emitting diodes on the market has a large light-emitting area of 0.3 mm, it is not possible to replace the laser light source in the light scanning system in the related art with a light-emitting diode.

SUMMARY OF THE PRESENT INVENTION

An original edge detecting system according to the present invention comprises:

an original placement table, on which an original paper sheet is placed;

original scanning means for causing a light beam to scan the original paper sheet placed on the original placement table;

light receiving means for receiving a light beam which has been reflected by the original paper sheet placed on the original placement table after being emitted by the original scanning means; and original edge determining means for monitoring light intensity of the light beam received by the light receiving means, the original edge determining means determining that the light beam currently being received by the light receiving means is a light beam reflected by an edge of the original paper sheet placed on the original placement table when a sharp variation is detected in the light intensity either for the first time or for the last time in one scanning operation of the original scanning means.

Thereby, edges of the original paper sheet can be suitably detected without being affected by an optical density of an image provided on the original paper sheet. As a result, a size of the original paper sheet can be correctly detected.

The original edge detecting system may further comprise an original pressing sheet for having the original paper sheet inserted between the original pressing sheet and the original placement table, wherein:

one of the original pressing sheet and the original placement table is substantially transparent, and through the transparent one the original scanning means causes the light beam to scan the original paper sheet inserted between the original pressing sheet and the original placement table; and a diameter of a cross section of the light beam emitted by the original scanning means is, at an incident surface of the original paper sheet, larger than an interval of dirty spots which possibly occur at intervals on the other one of the original pressing sheet and the original placement table.

Thereby, ripples possibly included in a waveform of intensity of received light due to the dirty spots at the intervals can be effectively eliminated. Thus, it is possible to cause a clear difference to appear between a received light intensity waveform resulting from being reflected by an edge of the original paper sheet and a received light intensity waveform resulting from being reflected by possible dirty spots at the intervals on the original pressing sheet. As a result, it is possible to suitably process an output signal from the light receiving means, and thus to precisely, easily recognize edges of the original paper sheet.

The original edge detecting system may further comprise threshold setting means for setting a threshold value with which the original edge determining means determines whether or not the light beam currently being received by the light receiving means is the light beam reflected by the edge of the original paper sheet placed on the original placement table, the threshold setting means setting the threshold value using a difference in the light intensity of the light beam received by the light receiving means when the sharp variation occurs in the received light intensity for the first time in the first scanning of the original paper sheet.

Thereby, the threshold value appropriate for a particular reflectivity of the original paper sheet can be automatically set. As a result, a size of the original paper sheet can be detected without being affected by a particular optical density of the original paper sheet.

It may be that:

the original scanning means uses a light-emitting diode as a light source of the light beam, and a single lens for converging the light beam on the original paper sheet, a ratio of a diameter of a light-emitting surface of the light-emitting diode to a diameter of a cross section of the light beam at a surface of the original paper sheet being approximately equal to a ratio of an optical-path length between the light-emitting diode and the single lens to an optical-path length between the single lens and the original paper sheet; and a beam splitter is located in a course of a retroreflection path between the surface of the original paper sheet and the light-emitting diode, the beam splitter partially reflecting light which has been reflected by the original paper sheet, the light receiving means, which receives light reflected by the beam splitter, being located at a position which is an approximately conjugate converging point with respect to the surface of the original paper sheet.

By making the ratio of the diameter of the light-emitting surface of the light-emitting diode to the diameter of the cross section of the light beam at the surface of the original paper sheet approximately equal to the ratio of the optical-path length between the light-emitting diode and the single lens to the optical-path length between the single lens and the original paper sheet, the light emitted by the light-emitting diode is incident on the original paper sheet with a desired light-spot diameter. The light reflected by the original paper sheet returns along the scanning light path and then is partially reflected by the beam splitter. Thus, the reflected light from the original paper sheet has a desired focus on the light receiving means, while reflected light from the other objects does not have a desired focus on the light receiving means. Thus, it is possible to clearly distinguish the light reflected by the original paper sheet from the light reflected by the other objects, and thus to precisely detect edges of the original paper sheet.

Further, in order to obtain an optical light-beam diameter and an optical light intensity of light incident on the light receiving means from the original paper sheet and original pressing sheet through the compact retroreflection path, the light-emitting diode, single lens and beam splitter are necessary. By using the beam splitter, in particular, it is possible to obtain a compact, high-performance sensor. This is because, in order to obtain an appropriate light-beam diameter using an ordinary light-emitting diode with high light-using efficiency, it is necessary to split the incident light from the reflected light in a condition in which a diameter of the light beam is large. Each of a beam splitter and a diffraction grating can achieve this splitting in the retroreflection path. However, if the diffraction grating is used, the light from the light-emitting diode disperses and does not converge. In contrast to this, the beam splitter is preferable in this purpose because the light emitted by the light-emitting diode converges. Therefore, an inexpensive combination of the light-emitting diode which is easy to drive and the single lens can be used for the light-beam scanning operation on the original paper sheet in the high-performance optical sensor.

The original edge detecting system may further comprises converging means, in addition to the single lens, for converging the light beam emitted by the light-emitting diode, the light beam being incident on the single lens after converging through the converging means. Thereby, diffusing light emitted by the light-emitting diode can be effectively collected and efficient use of the light beam emitted by the light-emitting diode can be achieved.

It may be that the light receiving means is provided at an arbitrary position but out of an optical path along which the light beam emitted by the light-emitting diode extends to the original paper sheet; and the light receiving means serves a wide-angle light receiving function and thus receives light reflected by the entirety of the scanning surface.

Thereby, the reflected light from the above-mentined original placement table does not pass the scanning optical path and is received by the light receiving means. Thus, the light receiving means can be located at an arbitrary position.

Another original edge detecting system according to the present invention comprises:

a transparent original placement table;

an original pressing sheet for overlying the original placement table;

light scanning means for scanning an original sheet on the original placement table through the original placement table with a light beam;

distance-detection light-receiving means for outputting a signal according to a length of incident-light path when receiving a light reflected by the original sheet; and original edge determining means which uses the signal output by the distance-detection light-receiving means, determines whether a light currently incident on the distance-detection light-receiving means is a light reflected by the original sheet, and determines positions of edges of the original sheet.

Thereby, although various lights such as those from the original sheet and the original pressing sheet, a disturbance light, and so forth, are incident on the distance-detection light-receiving means, by recognizing a length of the incident-light path through the distance-detection light-receiving means, it is possible to positively distinguish the light reflected by the original sheet from the others. As a result, during a scanning operation of the light scanning means, it is possible to determine that the light currently incident on the distance-detection light-receiving means is a light reflected by the original sheet even if there is no effective light intensity difference between a case where the light currently incident is a light reflected by the original sheet and other cases. Thereby, together using information of a scanning operation timing of the light scanning means, it is possible to precisely detect positions of edges of and, thereby, also a size of and an inclination of the original sheet.

In the original edge detecting system, it may be that:

the distance-detection light-receiving means comprises a plurality of light receiving areas arranged symmetrically with a symmetrical center corresponding to a center of the distance-detection light-receiving means; and a knife edge is provided in front of the distance-detection light-receiving means.

In this arrangement, according to the principle of the well-known knife edge method, the length of the incident-light path through the distance-detection light-receiving means can be recognized.

Instead, in the original edge detecting system, it may be that:

the distance-detection light-receiving means comprises a central light receiving area located in a center of the distance-detection light-receiving means and a peripheral light-receiving area located peripheral of the central light receiving area.

In this arrangement, according to the principle of the well-known beam size method, the length of the incident-light path through the distance-detection light-receiving means can be recognized.

Instead, in the original edge detecting system, it may be that:

the distance-detection light-receiving means comprises at least four light receiving areas arranged symmetrically with a symmetrical center corresponding to a center of the distance-detection light-receiving means; and a focal lens for converging an incident light and a cylindrical lens or a wedge prism are provided in front of the distance-detection light-receiving means.

In this arrangement, according to the principle of the well-known astigmatic method, the length of the incident-light path through the distance-detection light-receiving means can be recognized.

Instead, in the original edge detecting system, it may be that:

the distance-detection light-receiving means comprises a position-detection sensor which has a two-dimensional light receiving area; and a size, a shape, a light-intensity distribution or the like of a receiving light spot formed non the position-detection sensor varies as a length of an incident-light path from a point at which the light is reflected after being incident at the point as a result of a scanning operation by the light-scanning means.

In this arrangement, the length of the incident-light path through the distance-detection light-receiving means can be recognized through the position-detection sensor.

Instead, in the original edge detecting system, it may be that:

the distance-detection light-receiving means comprises a CCD sensor which has a two-dimensional light receiving area; and a size, a shape, a light-intensity distribution or the like of a receiving light spot formed on the position-detection sensor varies as a length of an incident-light path from a point at which the light is reflected after being incident at the point as a result of a scanning operation by the light-scanning means.

In this arrangement, the length of the incident-light path through the distance-detection light-receiving means can be recognized through the CCD sensor.

In the original edge detecting system, it may be that:

the distance-detection light-receiving means comprises a plurality of light receiving areas;

a predetermined bias component is subtracted from an output of a first one of the plurality of light receiving areas;

a predetermined bias component is subtracted from an output of a second one of the plurality of light receiving areas;

a result of subtracting the predetermined bias component from the output of the second one of the plurality of light areas is multiplied with a predetermined coefficient; and whether a light currently incident on the distance-detection light-receiving means is one reflected by the original sheet is determined by comparing a result of subtracting the predetermined bias component from the output of the first one of the plurality of light receiving areas with a result of the multiplication using the predetermined coefficient.

When a disturbance light incident on the distance-detection light-receiving means is a light from the sun, the light intensity of the incident light is so strong that the above-mentioned difference is extremely large. In contrast to this, there is a case where the disturbance light is a light produced in an ordinary office room environment. In such a case, if the distance-detection light-receiving means has split or a plurality of light receiving areas such as those shown in FIGS. 17A–17C, there is a tendency that light is uniformly incident on the split or plurality of light receiving areas when the length of the incident-light path is relatively long. Therefore, there are only small differences between outputs from the light receiving areas. In such a case, the bias components substantially adversely affect the above-mentioned distance determination. Therefore, subtracting the bias components from the outputs of the light receiving areas is advantageous.

In the original edge detecting system, a light-emitting diode may be used as a light source of the light scanning means. Thereby, it is possible to effectively reduce costs of the original edge detecting system.

An optical sensor according to the present invention comprises:

a light scanning mechanism which causes light emitted by a light-emitting diode to scan for a to-be-detected object;

a converging optical system which causes the light emitted by the light-emitting diode to converge on the to-be-detected object; and a beam splitter which partially reflects the light which has been reflected by the to-be-detected object, the reflected light being incident on light receiving means.

In this sensor, the light emitted by the light-emitting diode is caused to converge through the converging optical system and is used for the scanning operation for the to-be-detected object. The light reflected by the to-be-detected object returns along a retroreflection path the same as a scanning optical path. Then, the light is partially reflected by the beam splitter and the reflected light is incident on the light receiving means. Thus, by detecting variation in intensity of light received by the light receiving means, the presence of the to-be-detected object is detected.

In this arrangement, the inexpensive light-emitting diode, which is easily driven and for which any extra provision for fulfilling safety regulations is not needed, can be used. Thus, costs are effectively lowered.

The optical sensor may further comprise another converging optical system which causes the light reflected by the beam splitter to converge on the light receiving means. As a result, separate converging optical systems are used for the light emitted by the light-emitting diode and incident on the to-be-detected object and the light reflected by the to-be-detected object and incident on the light receiving unit, respectively. As a result, it is possible to use a lens having characteristics of a high value of NA (Numerical Aperture) as the converging optical system for the light emitted by the light-emitting diode and incident on the to-be-detected object. Thereby, it is possible to enhance light intensity of light being incident on the to-be-detected object. Further, the converging optical system for the light reflected by the to-be-detected object and incident on the light receiving unit is provided such that only the light reflected by the to-be-detected object has a desired focus on the light receiving means and light reflected by the other objects does not have a desired focus on the light receiving means. Thus, it is possible to improve an accuracy in detecting the to-be-detected object.

The converging optical system may further cause the light reflected by the beam splitter to converge on the light receiving means. Thereby, the common converging optical system is used for both the light emitted by the light-emitting diode and incident on the to-be-detected object and the light reflected by the to-be-detected object and incident on the light receiving unit. Thereby, it is possible to effectively lower costs and also miniaturize the optical sensor.

Another optical sensor according to the present invention comprises:

a light scanning mechanism which causes light emitted by a light-emitting diode to scan for a to-be-detected object;

a first converging optical system which causes the light emitted by the light-emitting diode to converge on the to-be-detected object; and a second converging optical system which causes the light reflected by the to-be-detected object to converge on light receiving means;

wherein the second converging optical system is located in a reflecting optical path along which the light reflected by the to-be-detected object extends, the reflecting optical path being different from a scanning optical path along which the light emitted by the light-emitting diode extends to the to-be-detected object.

Thereby, by using the inexpensive light-emitting diode on the market, a desired light-spot diameter appropriate for the to-be-detected object can be obtained. Further, the light reflected by the to-be-detected object is neither partially reflected nor split by, for example, the beam splitter. As a result, it is possible to efficiently use the light from the light-emitting diode.

Other objects and further features of the present invention will become more apparent from the following detailed description when read in conjunction with the accompanying drawings.

BRIEF DESCRIPTION OF THE DRAWINGS

FIGS. 1A and 1B show a general arrangement and a block diagram, respectively, of an original reading apparatus in a first embodiment of the present invention;

FIG. 5A shows a block diagram of an original reading apparatus in a third embodiment of the present invention;

FIG. 5B illustrates an operation of the apparatus shown in FIG. 5A.

FIG. 16 illustrates a ninth embodiment of the present invention;

FIGS. 17A–17C illustrate variation of a spot formed on a distance-detection light-receiving unit obtained as a length of an incident-light path varies in the embodiment shown in FIG. 16;

FIG. 23A shows a light path when an incident-light path length is relatively short, and FIG. 23B shows a shape of a spot in the condition shown in FIG. 23A;

FIGS. 24A and 24B show a light path when an incident-light path length is relatively long, and a shape of a spot in the condition shown in FIG. 24A, respectively, in the twelfth embodiment;

DESCRIPTION OF THE PREFERRED EMBODIMENTS

Figure 2:
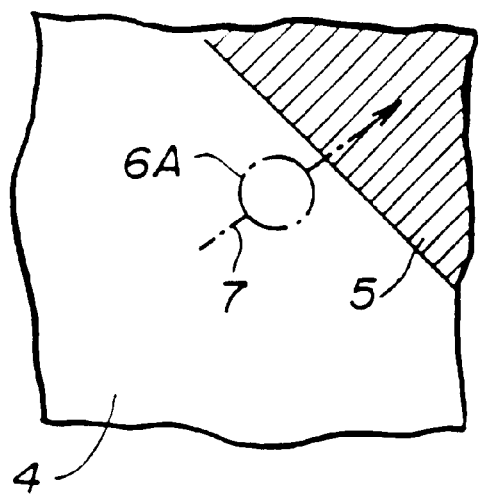
FIG. 2 illustrates a spatial relationship between an original paper sheet and a scan line in the apparatus shown in FIGS. 1A and 1B.

With reference to FIGS. 1A, 1B and 2, a first embodiment of the present invention will now be described. FIG. 1A shows a general arrangement of an original reading apparatus in the first embodiment of the present invention. The original reading apparatus may have an arrangement such as that shown in each of FIGS. 12, 14, 16 which will be described later for other embodiments of the present invention.

In the original reading apparatus, a light scanning unit 2 is provided inside a body 1 and emits a light beam 6. Above the light scanning unit 2, a transparent original placement table (contact glass) 3 on which an original paper sheet is placed is provided. Further, an original pressing sheet 4 is provided above the original placement table 3 and rotatably supported at the left end thereof in FIG. 1A. Thereby, the original pressing sheet 4 can be opened, as shown in FIG. 1A, so that a user can place an original paper sheet on the original placement table 3. The original pressing sheet 4 can be closed so that the original pressing sheet 4 is placed on the original placement table 3, such that an original paper sheet previously placed on the original placement table 3 is placed between the original pressing sheet 4 and the original placement table 3. Such a mechanism of the original placement table 3 and the original pressing sheet 4 for an original paper sheet is well-known as a mechanism of an ordinary copying machine on the market. The light scanning unit 2 causes the emitted light beam 6 to scan the original paper sheet placed on the original placement table 3 and the inner surface of the original pressing sheet 4.

An original paper sheet 5 (not shown in FIG. 1A but shown in FIGS. 1B and 2) is placed on the original placement table 3. As shown in FIG. 1B, the original reading apparatus further includes a light receiving unit 12 which receives the light beam 6, which has been emitted by the light scanning unit 2 and then reflected by the original paper sheet 5 and the original pressing sheet 4. The original reading apparatus further includes a scanning period signal outputting unit 122. The scanning period signal outputting unit 122 outputs a scanning period signal for a period of each scanning operation performed by the light scanning unit 2.

The original reading apparatus further includes an original edge determining unit 123. The original edge determining unit 123 monitors an intensity of the light beam 6 received by the light receiving unit 12. The scanning period signal output by the scanning period signal outputting unit 122 is used for the original edge determining unit 123 to define a duration of one scanning operation. The original edge determining unit 123 determines that the light beam 6 received by the light receiving unit 12 is a light beam reflected by an edge of the original paper sheet 5 when the intensity of the received light beam 6 sharply increases or sharply decreases for the first time or for the last time in the above-mentioned duration of one scanning operation.

An arrow shown in FIG. 2 represents a scanning direction of a scan line resulting from a movement of a spot 6A of the light beam 6 formed on the inner surface of the original pressing sheet 4 and the original paper sheet 5 by the light beam 6 emitted by the light scanning unit 2.

The light scanning unit 2 includes a light-emitting diode (not shown in the figures) which emits the light beam 6. A going direction of the emitted light beam 6 is deflected by a rotating deflecting member such as a polygon mirror and thereby the light beam scans the bottom surface of the original paper sheet 5.

The above-mentioned scanning period signal outputting unit 122 includes a detector, which detects part of the light beam 6 reflected by the above-mentioned rotating deflecting member, includes a light receiving sensor which is provided at a portion of the rotating deflecting member and detects a light beam emitted by the light-emitting diode in the course of each scanning operation, or includes means for obtaining a reference signal from a control signal which controls a motor driving the rotating deflecting member. Thereby, the scanning period signal outputting unit 122 outputs the scanning period signal for the period of each scanning operation.

In the above-described original reading apparatus, the size of the original paper sheet 5 placed on the original placement table 3 is read in a condition in which the original pressing sheet 4 is in a somewhat open state. Therefore, the light beam 6 emitted by the light scanning unit 2 is incident on the original paper sheet 5 placed on the original placement table 3 and other things. As a result, the light receiving unit 12 receives light reflected by the original paper sheet 5 and the inner surface of the original pressing sheet 4. Further, because the original pressing sheet 4 is in the somewhat open state, as mentioned above, the light receiving unit 2 also receives external light.

It is necessary to read the size of the original paper sheet 5 in a condition in which the original pressing sheet 4 is in a somewhat open state as mentioned above. This is because, when this size reading operation is performed in a condition in which the original pressing sheet 4 completely overlies and in contact with the original paper sheet 5 and the original placement table 3, it is difficult to distinguish between light reflected by the original paper sheet 5 and light reflected by the original pressing sheet 4.

In this condition in which the original pressing sheet 4 is in the somewhat open state, the light beam 6 reflected by the inner surface of the original pressing sheet 4 is diffused. Thereby, the intensity of the light beam 6 reflected and then received by the light receiving unit 12 is not high. However, in contrast to this, because approximately the entirety of the surface of the original paper sheet 5 is in contact with the original placement table 3, the light beam 6 reflected by the original paper sheet 5 has a high intensity. By detecting such a difference between these intensities of the received light beam 6, it is possible to determine, through the original edge determining unit 123, that the light beam 6 emitted by the light scanning unit 2 is incident at an edge of the paper sheet 5.

As mentioned above, the scanning period signal outputting unit 122 outputs the scanning period signal to the original edge determining unit 123. Thereby, the original edge determining unit 123 can recognize a period of each scanning operation of the light scanning unit 2. Thereby, as described above, the original edge determining unit 123 determines that the light beam 6 received by the light receiving unit 12 is the light beam 6 reflected by an edge of the original paper sheet 5 when intensity of the received light beam 6 sharply increases or sharply decreases for the first time or for the last time of the above-mentioned duration of one scanning operation.

The scanning period signal is output, during each of repetitious light beam 6 scanning operations, when the light beam 6 passes through an edge of the transparent original placement table 3, from which edge the light beams 6 starts scanning the transparent original placement table 3 during each of the repetitious light beam 6 scanning operations. A clock signal is used in the original edge determining unit 123 and the edge determining unit 123 starts counting clock pulses of the clock signal when the scanning period signal outputting unit 122 outputs the scanning period signal. When the original edge determining unit 123 determines that the light currently being received is light reflected by an edge of the original paper sheet 5, the current count value of the counting of the clock pulses of the clock signal is stored. The stored count value is used as data indicating positions of starting and ending edges of the original paper sheet 5 placed on the original placement table 3.

Actually, for example, the scanning operation is repeated approximately ten times per one second and the original-paper-sheet size reading operation is performed for one or two seconds.

There may be a case where the original paper sheet 5 is generally white and therefore has a high reflectivity, for example. In such a case, after one scanning operation is started and the scanning period signal is output by the scanning period signal outputting unit 122, the intensity of the light beam 6 received by the light receiving unit 12 sharply increases within a fixed time duration for the first time responding to the light beam 6 reaching the starting edge of the original paper sheet 5. This sharp increase in light intensity occurs when the light beam 6 emitted by the light scanning unit 2 is incident on the starting edge of the original paper sheet 5 having the high reflectivity placed on the original placement table 3. The light beam 6 is thus first incident on the original paper sheet 5 via the transparent original placement table 3. By detecting this sharp increase in light intensity, the original edge determining unit 123 can determine that the light beam 6 emitted by the light scanning unit 2 is incident on the edge of the original paper sheet 5.

Further, after that, intensity of light beam received by the light receiving unit 12 sharply decreases within a fixed time duration for the last time during the current scanning operation. This sharp decrease in light intensity occurs when the light beam 6 emitted by the light scanning unit 2 has passed across the other edge or the ending edge of the original paper sheet 5 placed on the original placement table 3, and thus the light beam 6 has passed across the original paper sheet 5. By detecting this sharp decrease in light intensity, the original edge determining unit 123 can determine that the light beam emitted by the light scanning unit 2 has been incident on the other edge or the ending edge of the original paper sheet 5.

There may be another case where the original paper sheet 5 is generally black and thus has a low reflectivity. In such a case, after one scanning operation has been started and the scanning period signal is output by the scanning period signal outputting unit 122, intensity of a light beam received by the light receiving unit 12 sharply decreases within a fixed time duration for the first time. This sharp decrease in light intensity occurs when the light beam 6 emitted by the light scanning unit 2 is incident on the starting edge of the original paper sheet 5 having the low reflectivity placed on the original placement table 3, and the light beam 6 is thus incident on the original paper sheet 5 for the first time. By detecting this sharp decrease in light intensity, the original edge determining unit 123 can determine that the light beam 6 emitted by the light scanning unit 2 is incident on the starting edge of the original paper sheet 5.

Further, after that, the intensity of the light beam 6 received by the light receiving unit 12 sharply increases within a fixed time duration for the last time during the current scanning operation. This sharp increase in light intensity occurs when the light beam 6 emitted by the light scanning unit 2 has passed across the other edge or the ending edge of the original paper sheet 5 having the low reflectivity placed on the original placement table 3, and thus the light beam 6 has passed across the original paper sheet 5. By detecting this sharp increase in light intensity, the original edge determining unit 123 can determine that the light beam 6 emitted by the light scanning unit 2 has been incident on the other edge or the ending edge of the original paper sheet 5.

Thus, the original edge determining unit 123 only detects such sharp increase and decrease in light intensity of the received light beam 6 for the first time and for the last time after receiving the scanning period signal from the scanning period signal outputting unit 122. For this purpose, the original edge determining unit 123 should ignore a relatively gentle variation in light intensity as a result of, for example, a light beam 6 emitted by the light scanning unit 2 being reflected by the inner surface of the original pressing sheet 4. A signal processing for obtaining such an effect can be easily embodied. For example, by providing a differentiating circuit, only a differential coefficient of intensity of light beam 6 received by the light receiving unit 12, having an amount not less than a fixed value, is maintained.

There may be various images provided on the original paper sheet 5, having various patterns of reflectivity variation, and thereby various variations in the intensity of light beam 6 reflected by the various images. However, as described above, the original edge determining unit 123 ignores any intermediate variation in the intensity of the light beam 6 received by the light receiving unit 12 other than the sharp increase or sharp decrease for the first time and sharp increase or sharp decrease for the last time in the intensity of the light beam 6 received by the light receiving unit 12 in one scanning operation. Thereby, it is possible to correctly recognize edges of an original paper sheet 5 without the recognition being affected by the contents of images present on the original paper sheet 5.

As described above, the original edge determining unit 123 determines that a light beam 6 currently received by the light receiving unit 12 is a light beam reflected from an edge of an original paper sheet 5 when a sharp increase or a sharp decrease in light intensity of the received light beam 6 for the first time and for the last time after receiving the scanning period signal from the scanning period signal outputting unit 122 is detected. For this purpose, an electrical or optical filter or the like is used for previously eliminating influence by disturbance light. Thereby, the original edge determining unit 123 uses only a light component corresponding to the light beam 6 which is emitted by the light scanning unit 2 and then reflected by either the original paper sheet 5 or the original pressing sheet 4.

The original reading apparatus in a second embodiment of the present invention will now be described with reference to FIGS. 3 and 4. For components identical to those in the above-described first embodiment, the same reference numerals are given and descriptions therefor are omitted. (A similar manner will be applied to descriptions of subsequent third, fourth, fifth and sixth embodiments.) The original reading apparatus in the second embodiment also has the structure shown in FIGS. 1A and 1B.

Generally speaking, the inner surface of the original pressing sheet 4 is white, but likely to be dirty. Further, in many cases, the inner surface of the original pressing sheet 4 is uneven at approximately 1-mm intervals. As a result, when the inner surface is dirty, there are dirty spots appearing at the same 1-mm intervals. Optical data of these dirty spots are also input to the light receiving unit 12 and reflectivity variation due to a dirty spot of the inner surface of the original pressing sheet 4 may be erroneously recognized as that of an edge of an original paper sheet 5. In order to eliminate such influence due to the dirty inner surface of the original pressing sheet 4, a diameter of the light beam 6 on an original paper sheet 5 placed on the original placement table 3 is determined to be not less than 2 mm. If the light beam 6 has an elliptic cross-section, the shortest diameter thereof should be not less than 2 mm.

In Japan, there are many standard paper sheet sizes such as A-series sizes and B-series sizes, and there are many standard paper sheet sizes for paper sheets used for a computer operation. Further, in other countries, there are other standard paper sheet sizes such as those based on the inch unit. In order to identify these standard paper sheet sizes through a single detecting device or a single computer software, it is necessary to recognize a minimum 6-mm space. In order to clearly identify a size of an original paper sheet 5, it is necessary that a waveform of the intensity of the light beam 6 received by the light receiving unit 12 does not include ripples. For this purpose, it is necessary to make the diameter of the light beam 6 on the original paper sheet 5 small. Consequently, the diameter of the light beam 6 on the original paper sheet 5 placed on the original placement table 3 is determined, in a case where the light beam 5 is a circular-cross-section light beam, to be not less than 2 mm and not more than 20 mm. In a case where the light beam 5 is an elliptic-cross-section light beam, the shortest diameter thereof should be not less than 2 mm and not more than 20 mm.

Figure 4:
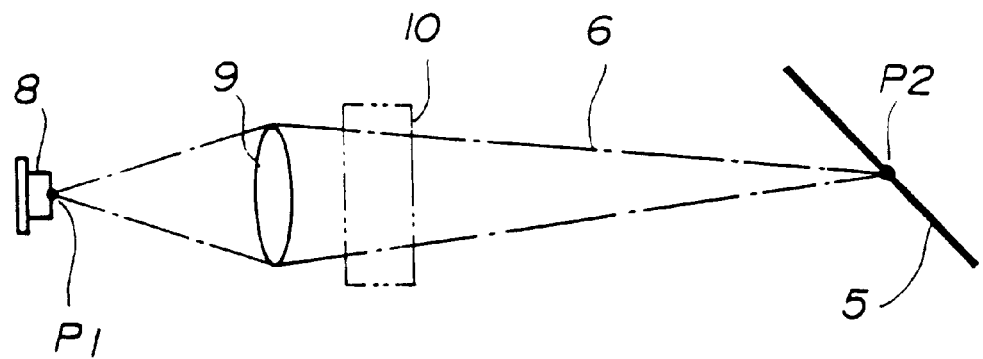
FIG. 4 shows an optical path arrangement from a light-emitting diode to a surface of an original paper sheet in the original reading apparatus in the second embodiment of the present invention.

Further, in order to efficiently narrow light reflected by either the original paper sheet 5 or the original pressing sheet 4 and to cause it to be incident to the light receiving unit 12, as shown in FIG. 4, a light-emitting point P1 (a light-emitting diode 8 in the light scanning unit 2) and a scanning point P2 (on the original paper sheet 5 placed on the original placement table 3) are approximately conjugate with one another. (In the this specification, the term 'conjugate' refers to 'conjugate in the geometrical optics field'.) In the light scanning unit 2, the light beam 6 emitted by the light-emitting diode 8 converges through a single lens 9, and a deflecting unit 10 deflects the light beam 6 so as to cause the light beam 6 to scan either the original paper sheet 5 or the original pressing sheet 4. The deflecting unit 10 is made of, for example, a mirror or a prism and a motor which drives the mirror or prism.

Thus, in the original reading apparatus in the second embodiment of the present invention, a general pattern of dirt possibly occurring on the inner surface of the original pressing sheet 4 is assumed. Thus, from a thus-assumed general distance between adjacent dirty spots, either the diameter of a circular-cross-section light beam 6 on a scanning surface (that is, a surface scanned by the light beam 6) is to be not less than 2 mm, or the shortest diameter of an elliptic-cross-section light beam on the scanning surface is to be not less than 2 mm. The light receiving unit 12 has, incident thereon, not only light reflected by an original paper sheet 5 but also light reflected by the inner surface of the original pressing sheet 4. However, even if the inner surface of the original pressing sheet 4 has dirty spots occurring thereon at approximately 1-mm intervals, by using the light beam 6 having the cross-section diameter not less than 2 mm on the scanning surface, a waveform of the intensity of the light beam 6 received by the light receiving unit 12 after being reflected by the dirty inner surface of the original pressing sheet 4 is smoothed and does not include ripples.

Accordingly, it is easy to distinguish a sharp variation waveform of received light intensity resulting from reflection by edges of an original paper sheet 5 from a smooth waveform of received light intensity resulting from reflection by the inner surface of the original pressing sheet 4. Thereby, without being affected by dirt occurring on the inner surface of the original pressing sheet 4, an output signal (indicating the intensity of the light received by the light receiving unit 12) of the light receiving unit 12 can be suitably processed. As a result, edges of an original paper sheet 5 can be easily, precisely recognized.

Figure 3:
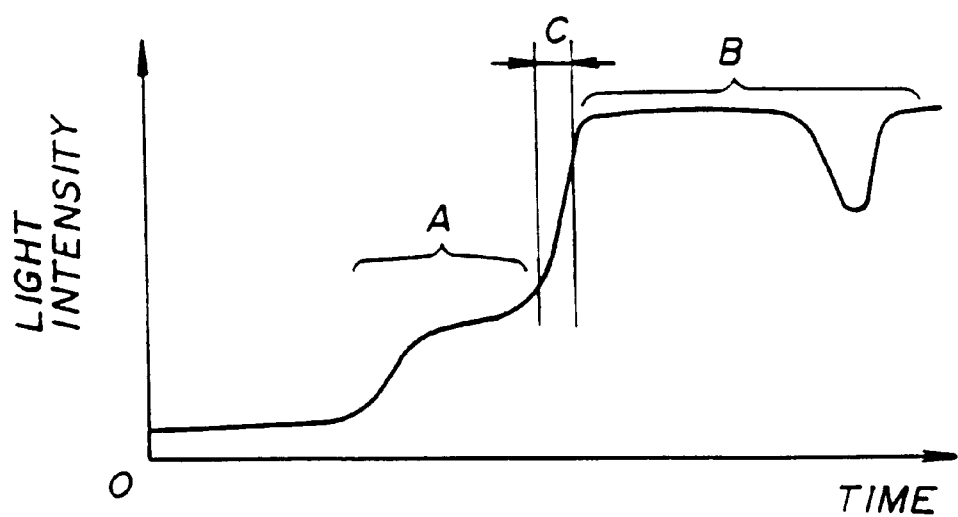
FIG. 3 shows a graph indicating variation of received light intensity on a light receiving unit in an original reading apparatus in a second embodiment of the present invention.

FIG. 3 shows an example of a waveform of intensity of light reflected by the inner surface of the original pressing sheet 4 and an original paper sheet 5, and then received by the light receiving unit 12 when a light beam having a cross-section size according to the second embodiment is used as the light beam 6 emitted by the light-emitting diode 8 of the light scanning unit 2. A portion A of the waveform indicates light intensity when the light beam 6 scans the inner surface of the original pressing sheet 4. A portion B of the waveform indicates light intensity when the light beam 6 scans the original paper sheet 5. A length indicated by C in the figure corresponds to the cross-section diameter of the light beam 6 on either the original paper sheet 5 or the original pressing sheet 4.

With reference to FIG. 5A, an original reading apparatus in a third embodiment of the present invention will now be described. The original reading apparatus in the third embodiment has a structure shown in FIGS. 1A and 5, and includes a threshold setting unit 124 connected with the original edge determining unit 123.

An operation of the original reading apparatus in the third embodiment will be now described. The original edge determining unit 123 measures variation of light intensity of a light beam 6 received by the light receiving unit 12 during the first scanning operation. Based on a result of the light intensity variation measurement, the threshold setting unit 124 determine a first sharp light intensity variation in the measurement result as an intensity variation resulting from the starting edge of the original paper sheet 5 placed on the original placement table 3 being scanned by the light beam 6.

Then, the threshold setting unit 124 obtains a difference, in the intensity of the received light, when the sharp variation occurs, between the first intensity before the sharp variation and the second intensity after the sharp variation. The threshold setting unit 124 determines an intensity value intermediate between these first and second intensities to be a threshold value. The thus-determined threshold value is used for the above-mentioned determination performed by the original edge determining unit 123 to determine the positions of the starting and ending edges of the original paper sheet 5. Specifically, the original edge determining unit 123 determines instances when the intensity received by the light receiving unit 12 passes through the threshold value as being instances when the scanning light beam 6 reaches the starting and ending edges of the original paper sheet 5.

For example, with reference to FIG. 5B, in the case where the original paper sheet 5 is a white paper sheet, the intensity of the light received by the light receiving unit 12 first sharply increases when the light beam 6 reaches the starting edge of the paper sheet 5 in one scanning operation. Then, the threshold determining unit 124 determines an intensity value intermediate between an intensity value immediately before the sharp intensity increase and the intensity value immediately after the sharp intensity increase. Then, in a second scanning operation by the light scanning unit 2, in which a scanning path may be slightly shifted from that of the first scanning operation (by slightly shifting the light scanning path repeatedly, it being possible to scan the entire area of the original placement table 3), the original edge determining unit 123 uses the thus-determined threshold level. When the intensity of the received light received by the light receiving unit 12 first passes through the threshold value, that is, the intensity of the received light increases and reaches the threshold value. Then, the original determining unit 123 determines that it is an instance at which the scanning light beam 6 reaches the starting edge of the paper sheet 5. Then, also in the second scanning operation, the intensity of the received light received by the light receiving unit 12 again passes through the threshold value, that is, the intensity of the received light decreases and reaches the threshold value. Then, the original determining unit 123 determines that it is an instance at which the scanning light beam 6 reaches the ending edge of the paper sheet 5.

Thus, in the third embodiment, the threshold value is automatically determined by the threshold setting unit 124 depending on a reflectivity of an original paper sheet 5 currently placed on the original placement table 3. Thereby, the determined threshold value is appropriate for the reflectivity of the currently placed original paper sheet 5. As a result, in subsequent scanning operations performed on the same paper sheet 5, edges of the original paper sheet 5 can be surely, easily detected. Thus, sure and easy original edge detection is performed without being affected by an-optical density of a particular original paper sheet 5.

Figure 6:
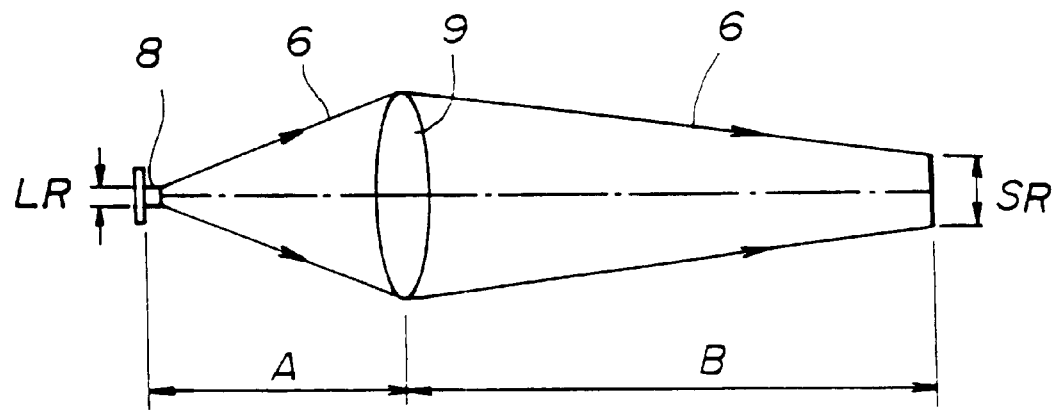
FIG. 6 shows a light beam in a scanning optical path in an original reading apparatus in a fourth embodiment of the present invention.
Figure 7:
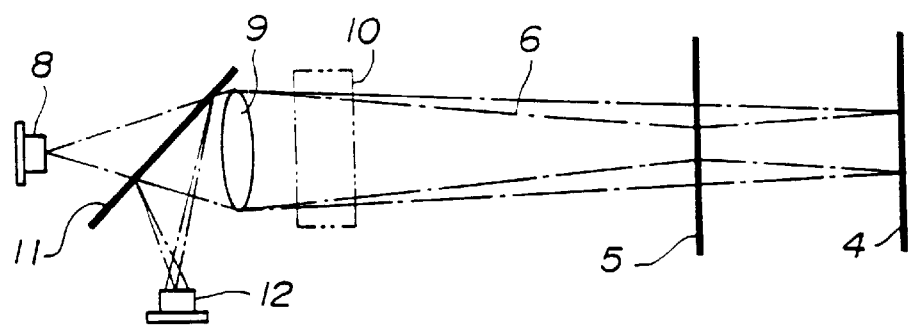
FIG. 7 shows an optical path arrangement in the original reading apparatus in the fourth embodiment of the present invention.
Figure 8:
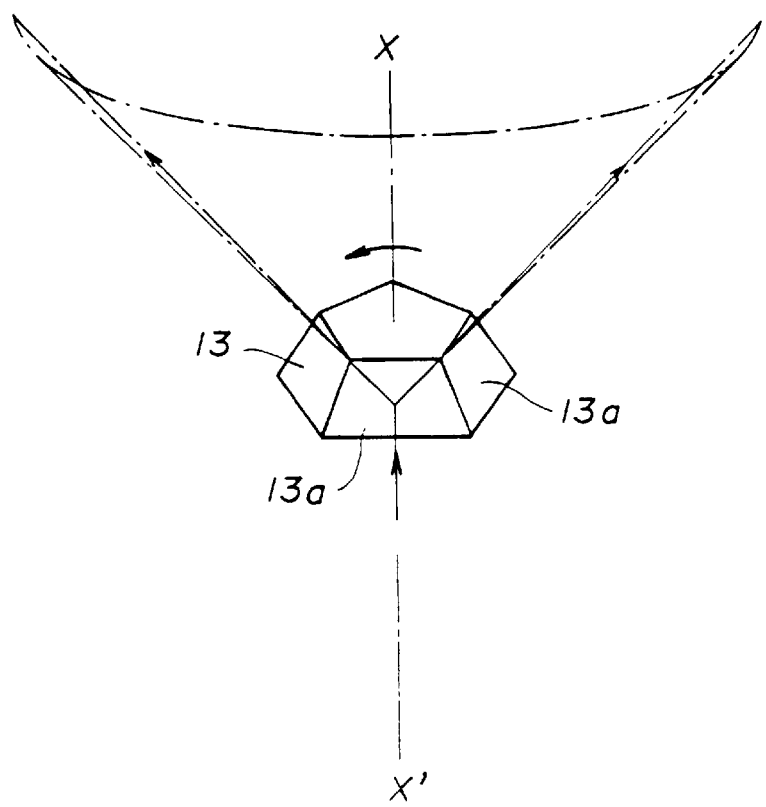
FIG. 8 shows a perspective view of a mirror in a deflecting unit for illustrating a deflection function in the original reading apparatus in the fourth embodiment of the present invention.

With reference to FIGS. 6, 7 and 8, an original reading apparatus in a fourth embodiment of the present invention will now be described. Generally, the original reading apparatus in the fourth embodiment has a structure shown in FIG. 1A. The apparatus uses the above-mentioned light-emitting diode 8 as a light source for performing a light scanning operation. The above-mentioned single lens 9 is provided in an optical path between the light-emitting diode 8 and a surface of the original paper sheet 5.

With reference to FIG. 6, a light beam 6 is emitted by a light-emitting surface having a diameter LR of the light-emitting diode 8, passes through the single lens 9 and then is incident on the surface of the original paper sheet 5 with a light-beam cross section having a diameter SR. Precisely speaking, the diameter SR is a diameter which is not always a diameter of a light-beam cross section on an actual surface of the original paper sheet 5 but is a diameter of the light-beam cross section perpendicular to a direction of the optical path of the light beam 6. An optical path length A is provided between the light-emitting diode 8 and the single lens 9, and an optical path length B is provided between the single lens 9 and the original paper sheet 5. There, a ratio of the diameter LR to the diameter SR is approximately equal to a ratio of the length A to the length B. That is, LR:SR≈A:B.

Further, a beam splitter 11 shown in FIG. 7 is provided between the single lens 9 and the light-emitting diode 8. The beam splitter 11, made of a semitransparent mirror, is thus provided in the course in which a light beam 6 emitted by the light-emitting diode 8 is diverging. The beam splitter 11 reflects light which has been reflected by the original paper sheet 5 or the original pressing sheet 4, then diffused and returned. Further, the light receiving unit (detector) 12 is provided and receives light thus reflected by the beam splitter 11. The detector 12 is located so that the detector 12 acts as a light converging point which is conjugate with the surface of the original paper sheet 5.

The light beam 6 caused to converge by the single lens 6 is deflected by the above-described deflecting unit 10 and thus performs the light scanning operation. In this case, as to be used in the deflecting unit 10, a mirror which generates a non-aberration light beam 6 is more preferable than a prism which generates astigmatism. The astigmatism of the prism occurs when the light beam 6 emitted from the light scanning unit 2 is incident thereon and also occurs when a reflected light beam 6 reflected by either the original paper sheet 5 or the original pressing sheet 4 is incident thereon.

If a rotating mirror 13 is used in the deflecting unit 10 as shown in FIG. 8, it is preferable to provide a significant angle between a rotation axis X–X' and each reflecting surface 13a. Thereby, it is possible to provide a significant angle between the light beam emitted toward the original paper sheet 5 and the light beam reflected by either the original paper sheet 5 or the original pressing sheet 4. As a result, it is possible to prevent a case where light reflected by a reflecting surface 13a is incident on the light receiving unit 12 as noise.

Further, in the fourth embodiment, the light-emitting diode 8 has a light-emitting surface S1 of a diameter D1 of approximately 0.3 mm. The light-emitting diode 8 is one which is a very popular, inexpensive item on the market.

In the above-described structure, a light beam 6 emitted by the light-emitting diode 8 is used for scanning the scanning surface (for example, the surface of the original paper sheet 5) and has a desired beam cross-section diameter as a result of being converged by the single lens 9. The light beam 6 is reflected by the scanning surface and returned along the scanning optical path. The light beam 6 is then partially reflected by the beam splitter 11. Thereby, the light beam 6 reflected by the original paper sheet 5 in the example is incident on the light receiving unit 12 in a condition of being properly focused at an incident surface of the light receiving unit 12.

As mentioned above, the original pressing sheet 4 is in a somewhat open state when the size of the original paper sheet 5 placed on the original placement table 3 is read. Therefore, the inner surface of the original pressing sheet 4 is farther from the light-emitting diode 8 than the original paper sheet 5 as shown in FIG. 7. As a result, a light beam reflected by the inner surface of the original pressing sheet 4 is incident on the light receiving unit 12 in a condition of not being properly focused. However, a light beam resulting from the light scanning operation at an edge of the original paper sheet 5 is incident on the light receiving unit 12 in the condition of being properly focused. Thereby, a corresponding optical signal input to the light receiving unit 12 has a correct value. Accordingly, it is possible to surely recognize edges of the original paper sheet 5.

Thus, in the fourth embodiment of the present invention, it is not necessary to use a laser diode as the light source for the light scanning operation. Instead, the light-emitting diode 8 is used for the same purpose. The light-emitting diode 8 used is such as that having a somewhat large light-emitting surface. As a result, fulfillment of any safety regulation is not necessary therefor, it is easy to drive the light-emitting diode 8, and the light-emitting diode 8 is an inexpensive item on the market. Further, by using an inexpensive combination of the light-emitting diode 8 and the single lens 9, it is possible to supply a light beam having a desired light-beam cross-section diameter. Thus, costs are effectively saved.

Further, in the fourth embodiment, the light scanning operation is performed using the beam splitter 11, having a certain NA (Numerical Aperture), and thus the light beam 6 is caused to converge. The resulting converging point is on approximately the surface of the original paper sheet 5. According to this condition, a diameter of the thus-converging light beam 6 on an object, other than the original paper sheet 5, for example, on the inner surface of the original pressing sheet 4, is larger as the object is farther from the light-emitting diode 8 than the original paper sheet 5. A light beam reflected by the object such as the original pressing sheet 4 and diffused has a larger cross-section diameter. The light beam is then incident on the light receiving unit 12. As a result, intensity of the thus-incident light beam is less strong than intensity of the light beam reflected by the original paper sheet 5. Therefore it is easy to distinguish the light beam reflected by the original paper sheet 5 from that reflected by another object such as the original pressing sheet 4. In this case, by providing an aperture of a small diameter on a front surface of the light receiving unit 12, or by using the light receiving unit 12 having a small diameter thereof, it is possible to prevent disturbance light and to collect only light which is a light component of the beam center and therefore has higher power.

Figure 9:
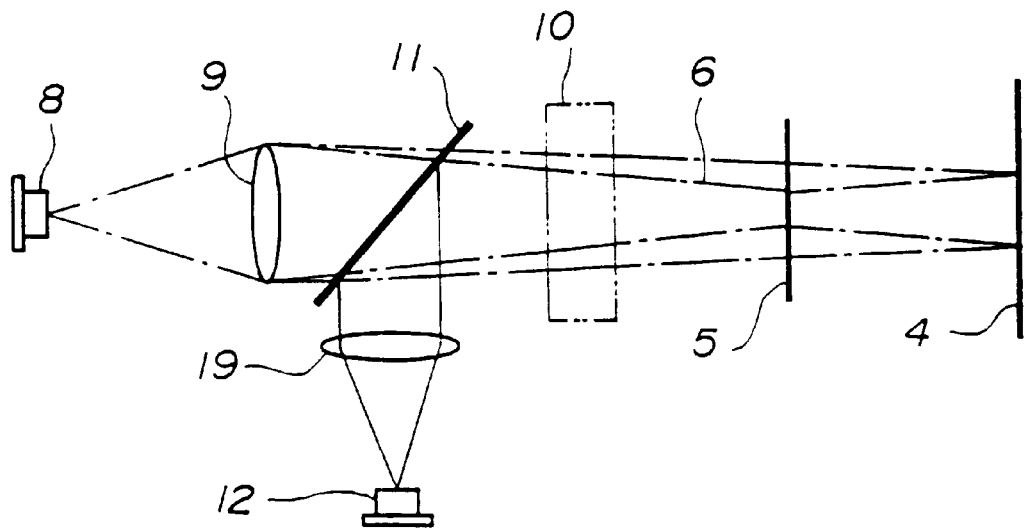
FIG. 9 shows another optical path arrangement in the original reading apparatus in the fourth embodiment of the present invention.

In the fourth embodiment, the beam splitter 11 is located in the retroreflection path between the light-emitting diode 8 and the original paper sheet 5. As one example of this arrangement, the beam splitter 11 is located between the single lens 9 and the light-emitting diode 8 as shown in FIG. 7. However, instead, it is also possible that, as shown in FIG. 9, the beam splitter 11 is located on the original paper sheet 5 side of the single lens 9. In this case, a focal lens 19 is provided between the beam splitter 11 and the light receiving unit 12. The beam splitter 11 reflects light which has been reflected by the original paper sheet 5 or the original pressing sheet 4, then diffused and returned. The focal lens 19 converges the light beam reflected by the beam splitter 11 so that the light beam which has been reflected by the original paper sheet 5 is properly focused at the incident surface of the light receiving unit 12.

In the arrangement shown in FIG. 9, an additional lens, that is, the focal lens 19 should be provided, in comparison to the arrangement shown in FIG. 7. However, similar to the arrangement shown in FIG. 7, the light-emitting diode is used and has a somewhat large light-emitting surface. As a result, fulfillment of any safety regulation is not necessary therefor, it is easy to drive the light-emitting diode 8, and the light-emitting diode 8 is an inexpensive item on the market. Further, by using an inexpensive combination of the light-emitting diode 8 and the single lens 9, it is possible to supply a light beam having a desired a light-beam cross-section diameter. Thus, costs are effectively saved.

Figure 10:
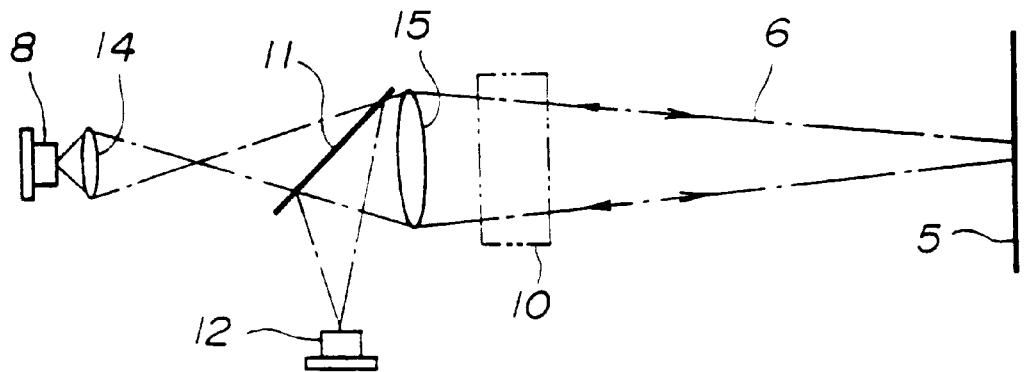
FIG. 10 shows an optical path arrangement in an original reading apparatus in a fifth embodiment of the present invention, showing a scanning optical path from a light-emitting diode to a scanning surface and a reflecting optical path from the scanning surface to a light receiving unit.

With reference to FIG. 10, an original reading apparatus in a fifth embodiment will now be described. Generally, the original reading apparatus in the fifth embodiment has a structure shown in FIG. 1A. In this embodiment, as shown in FIG. 10, a light beam 6 emitted by the light-emitting diode 8 is caused to converge through a converging element (lens) 14. Then, another converging lens 15 causes the light beam 6 to converge. The converging light beam 6 is then used for the light scanning operation performed on a scanning surface. In the arrangement shown in FIG. 10, a diffusing light beam from the light-emitting diode 8 can be efficiently collected by the converging element 14. The collected light beam 6 is then caused to converge onto the surface of the original paper sheet 5 through the converging lens 15. Thus, it is possible to efficiently use light power output by the light-emitting diode 8.

The other arrangement of the original reading apparatus in the fifth embodiment and functions thereof are substantially identical to those of the original reading apparatus in the fourth embodiment, part of which is shown in FIG. 7.

In the embodiments shown in FIGS. 7, 9 and 10, the light path along which light emitted by the light-emitting diode 8 goes and is approximately focused on the original paper sheet 5 and also returns from the original paper sheet 5 to the light receiving unit 2, substantially along the same optical axis. Such an optical system may be referred to as a retroreflection optical system. In the retroreflection optical system, it is possible to substantially prevent disturbance light, other than light originally emitted by the light-emitting diode 8 and reflected by the original paper sheet 5 and the original pressing sheet 4, from incident on the light receiving unit 12. In the retroreflection optical system, substantially only light reflected by an object present on the optical axis returns along the optical axis.

Figure 11:
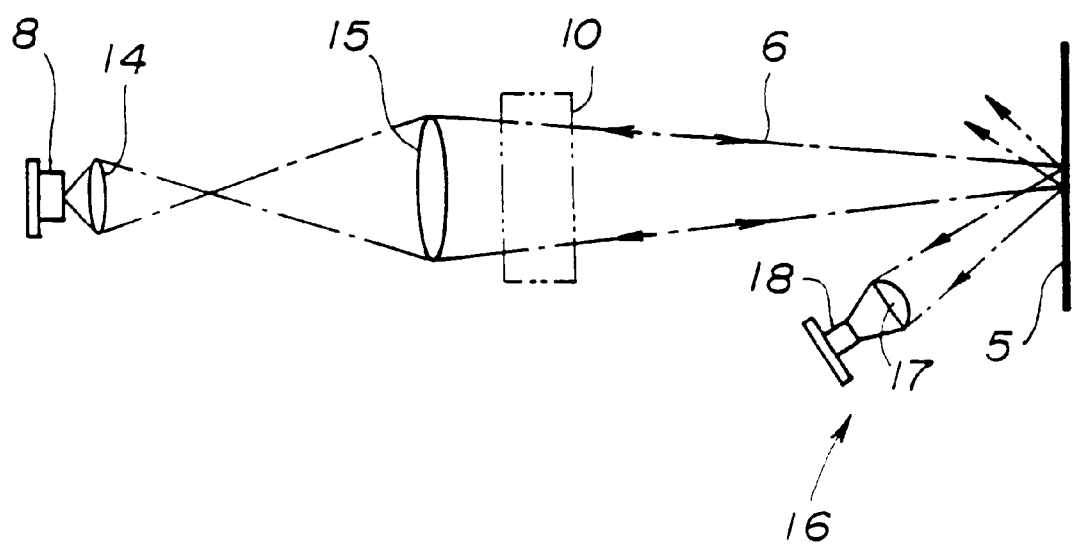
FIG. 11 shows an optical path arrangement in an original reading apparatus in a sixth embodiment of the present invention, showing a scanning optical path from a light-emitting diode to a scanning surface and a reflecting optical path from the scanning surface to a light receiving unit.

With reference to FIG. 11, an original reading apparatus in a sixth embodiment will now be described. Generally, the original reading apparatus in the sixth embodiment has a structure shown in FIG. 11A and does not use the retroreflection optical system. Further, as shown in FIG. 11, the original reading apparatus has a structure identical to that shown in FIG. 10, except that a light receiving unit 16 is provided instead of the beam splitter 11 and the light receiving unit 12 shown in FIG. 10. In the arrangement shown in FIG. 11, the light receiving unit 16 is provided at an arbitrary position but out of an optical path along which a light beam 6 emitted by the light-emitting diode 8 extends to an original paper sheet 5. The light receiving unit 16 includes a converging lens 17 and a detector 18. The light receiving unit 16 has a wide-angle light receiving function and thus receives light reflected by the entirety of the scanning surface. In other words, the light receiving unit 16 receives light reflected from any position of an original paper sheet 5 placed on the original placement table 3 as long as the original paper sheet 5 is placed within an area which the deflecting unit 10 in the light scanning unit 2 can cause a light beam 6 to scan.

The converging lens 17 is such as a toroidal lens which collects light reflected by a surface of an original paper sheet 5 and the inner surface of the original pressing sheet 4 through the entire scanning range of the light scanning unit 2 in one scanning operation of the light scanning unit 2. The detector 18 has a wide light-receiving surface thereon and receives light collected by the converging lens 17.

In the arrangement shown in FIG. 11, a light beam 6 emitted by the light-emitting diode 8 is caused to scan the surface of the original paper sheet 5 and the inner surface of the original pressing sheet 4 through the deflecting unit 10. Light, which is reflected by the surface of the original paper sheet 5 and the inner surface of the original pressing sheet 4 and does not pass through the scanning optical path between the deflecting unit 10 and the original paper sheet 5 or the original pressing sheet 4, is received by the light receiving unit 16. Thus, in the sixth embodiment, scattered light reflected by the original paper sheet 5 is used. Therefore, it is possible to locate the light receiving unit 16 in an arbitrary position such as a position in proximity to the original placement table 3 or the like.

With reference to FIGS. 12, 13A, 13B and 13C, an original reading apparatus in a seventh embodiment of the present invention will now be described. In this apparatus, a body 1 has therein a light scanning unit 2 which scans, with the light beam 6, the original paper sheet 5 from an inner side of the transparent original placement table 3. In the light scanning unit 2, light emitted by the light-emitting diode 8 and having several millimeters of a spot diameter is reflected by the beam splitter 11. The reflected light is converged through the focal lens 19, and then is used to scan the original placement table 3 through the mirror 13 driven by a polygon motor 10a and thus turning. In this case, a scanning line 7 forms an arc as a result of the light beam 6 scanning with a certain incident angle to a normal to the original placement table 3. The scanning light beam 6 is reflected by the original paper sheet 5 through the transparent original placement table 3. The reflected scattered light returns through a retroreflection path through which the light beam 6 reflected by the mirror 13 is incident on the original paper sheet 5. The transparent original placement table 3 also reflects the scanning light beam 6 and the reflected scattered light also returns through the retroreflection path.

In the retroreflection path, a distance-detection light-receiving unit 20 is provided. The distance-detection light-receiving unit 20 receives light which passes through the beam splitter 11, and outputs a signal which depends on a length of an incident-light path. A knife edge 21 is provided in front of the distance-detection light-receiving unit 20 as shown in FIG. 12.

Figures 13A, 13B, 13C:
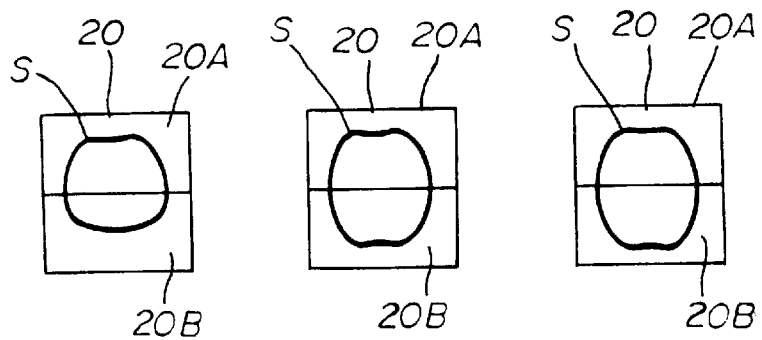
FIGS. 13A–13C illustrate variation of a spot formed on a distance-detection light-receiving unit obtained as a length of an incident-light path varies in the embodiment shown in FIG. 12.

As shown in FIGS. 13A–13C, the distance-detection light-receiving unit 20 includes a two-piece photodiode which has two light receiving areas 20A, 20B. The two light receiving areas are arranged symmetrically with a split line which crosses a light axis of the focal lens 19. Further, an original edge determining unit 123A receives a detection signal output by the distance-detection light-receiving unit 20. Using the received detection signal, the original edge determining unit 123A determines a position of an edge of the original paper sheet 5 with respect to the original placement table 3. Whether the light currently being received by the distance-detection light-receiving unit 20 is the light reflected by an edge of the original paper sheet 5 is determined, by the distance-detection light-receiving unit 20 as will be described later.

Figure 12:
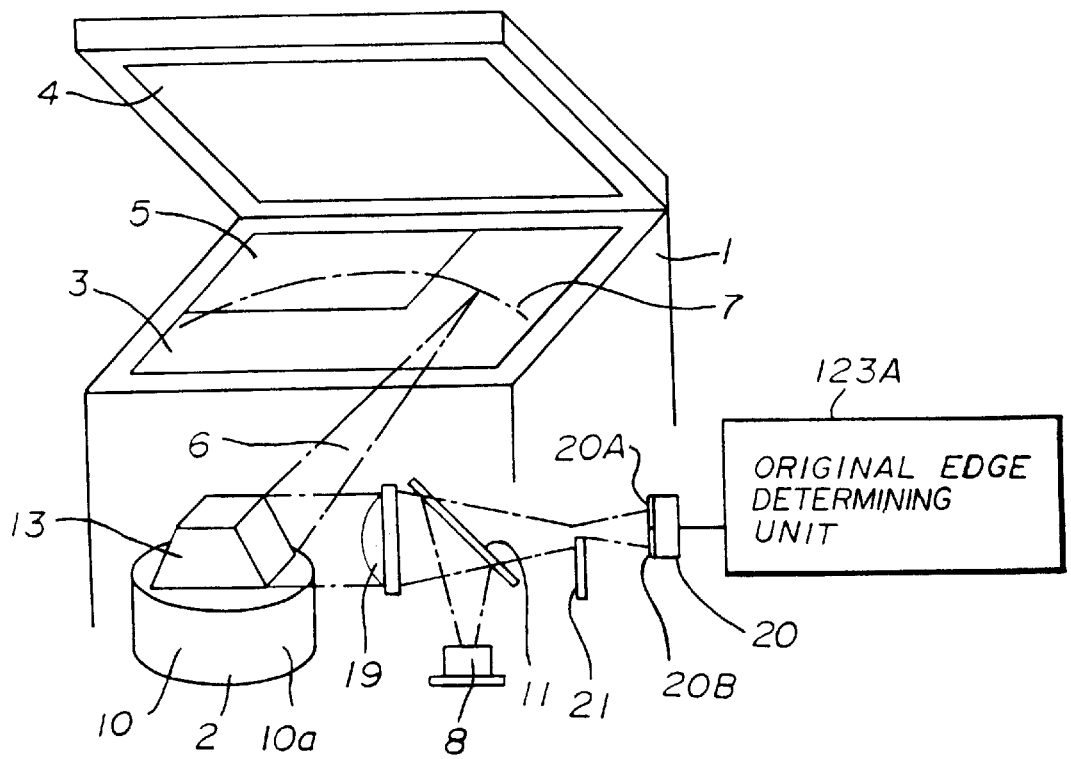
FIG. 12 illustrates a seventh embodiment of the present invention.

In this arrangement, in a condition in which the original pressing sheet 4 is in an open position as shown in FIG. 12, the light emitted by the light emitting diode 8 is used for scanning the original paper sheet 5 and the original pressing sheet 4 through the light scanning unit 2. As a result, the light is reflected by the original paper sheet 5 and the original pressing sheet 4. The thus-reflected light is incident on the distance-detection light-receiving unit 20. In addition, other disturbance light from room lightings and so forth is also incident on the distance-detection light-receiving unit 20. The knife edge 21 is provided in front of the distance-detection light-receiving unit 20 and affects the light before it is incident on the distance-detection light-receiving unit 20. As a result, according to the principle of the well-known knife edge method, a position of a spot S, shown in FIGS. 13A–13C, formed by the incident light on the distance-detection light-receiving unit 20 varies as a length of an incident-light path varies. The length of an incident-light path is a length of a light path through which the light comes to the distance-detection light-receiving unit 20 from a source such as the original paper sheet 5, original pressing sheet 4, or room lightings or the like from which disturbance light is emitted.

FIG. 13A shows a position and a shape of the spot S formed on the distance-detection light-receiving unit 20 when the length of the incident-light path is relatively short. As shown in the figure, the position of the spot S is relatively high. FIG. 13C shows a position and a shape of the spot S formed on the distance-detection light-receiving unit 20 when the length of the incident-light path is relatively long. As shown in the figure, the position of the spot S is relatively low. FIG. 13B shows a position and a shape of the spot S formed on the distance-detection light-receiving unit 20 when the length of the incident-light path is a middle length. As shown in the figure, the position of the spot S is in a middle position. As shown in FIGS. 13A–13C, each spot S consists of two parts, each part being formed on a respective one of the two light-receiving areas 20A, 20B of the distance-detection light-receiving unit 20. The distance-detection light-receiving unit 20 has performance such that an output A or B from each of the two light-receiving areas 20A, 20B varies as an area of a respective part of the spot S formed thereon varies. Therefore, as the length of the incident-light path varies, the outputs A, B from the two light-receiving areas 20A, 20B vary, respectively. Specifically, as an area of the part of the spot S formed on each of the two light-receiving areas 20A, 20B increases, the output thereof increases. Therefore, the distance-detection light-receiving unit 20 uses the outputs A, B, and thus recognizes the length of the incident-light path of the light currently being incident on the distance-detection light-receiving unit 20.

For example, the focal lens 19, distance-detection light-receiving unit 20 and knife edge 21 are positioned to have a predetermined spatial arrangement. In this condition, when the distance-detection light-receiving unit 20 receives the light which has been reflected from the original paper sheet 5 placed on the transparent original placement table 3 and then affected by the knife edge 21 according to the principle of the knife edge method, the length of the incident-light path is relatively short. As a result, similar to the case shown in FIG. 13A, an area of a part of the spot S formed on the upper light receiving area 20A is larger than an area of the other part of the spot S formed on the lower light receiving area 20B. Thereby, a magnitude of the output A is larger than a magnitude of the output B (A>B).

When the distance-detection light-receiving unit 20 receives the light which has been reflected from the original pressing sheet 4 in the open position and then affected by the knife edge 21 according to the principle of the knife edge method, the length of the incident-light path is relatively large. As a result, similar to the case shown in FIG. 13C, an area of a part of the spot S formed on the upper light receiving area 20A is smaller than an area of the other part of the spot S formed on the lower light receiving area 20B. Thereby, a magnitude of the output A is smaller than a magnitude of the output B (A<B).

By positioning the focal lens 19, distance-detection light-receiving unit 20 and knife edge 21 as described above according to the predetermined spatial arrangement, when the distance-detection light-receiving unit 20 receives other disturbance light originating from room lightings and or the like and then affected by the knife edge 21 according to the principle of the knife edge method, a magnitude of the output A is also smaller than a magnitude of the output B (A<B). This is because it can be determined that the length of the incident-light path when such disturbance light is incident is longer than the length of the incident-light path when the light reflected by the open-position original pressing sheet 4 is incident. Therefore, the distance-detection light-receiving unit-20 uses a condition, in which the two magnitudes of the outputs A and B are equal to each other (A=B), as a threshold condition for determining whether the light currently incident on the distance-detection light-receiving unit 20 is the light reflected by the original paper sheet 5 placed on the original placement table 3. The distance-detection light-receiving unit 20 determines that the light currently incident on the distance-detection light-receiving unit 20 is the light reflected by the original paper sheet 5 placed on the original placement table 3 when A>B.

Then, the distance-detection light-receiving unit 20 outputs the detection signal.

By using this method, it is possible to positively determine whether the incident light is the light reflected by the original paper sheet 5 on the original placement table 3, even if light intensities received by the distance-detection light-receiving unit 20 are not remarkably different between the light reflected by the original paper sheet 4 on the original placement table 3, the light reflected by the open-position original pressing sheet 4 and other disturbance light. The detection signal output from the distance-detection light-receiving unit 20 and another predetermined signal output from the light scanning unit 2 are input to the original edge determining unit 123A. The predetermined signal from the light scanning unit 2 indicates a timing of the light scanning performed thereby. Using the detection signal from the distance-detection light-receiving unit 20, the original edge determining unit 123A can recognize a time when the light beam 6 is incident on an edge of the original paper sheet 5. Thus, by using the thus-detected time of the edge of the original paper sheet 5 and the timing of the light scanning, the original edge determining unit 123A can detect a position of the edge of the original paper sheet 5 with respect to the original placement table 3.

With reference to FIGS. 14, 15A, 15B and 15C, an original reading apparatus in an eighth embodiment of the present invention will now be described.

Figures 15A, 15B, 15C:
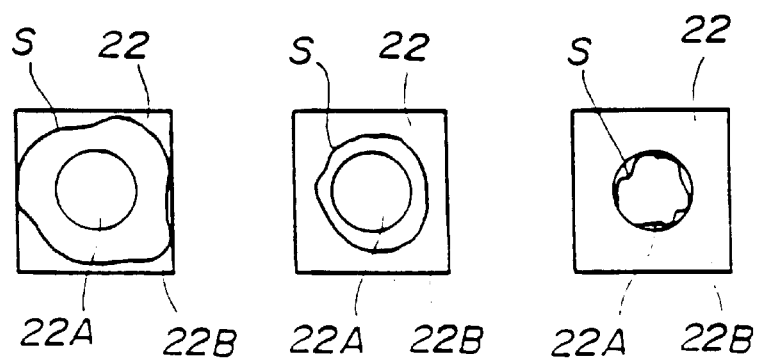
FIGS. 15A–15C illustrate variation of a spot formed on a distance-detection light-receiving unit obtained as a length of an incident-light path varies in the embodiment shown in FIG. 14.

In this embodiment, instead of the distance-detection light-receiving unit 20 in the above-described seventh embodiment, a distance-detection light-receiving unit 22 is used. The distance-detection light-receiving unit 22 is also a two-piece photodiode called a 'the rising-sun flag (well-known Japanese national flag) type' photodiode. The distance-detection light-receiving unit 22 has, as shown in FIGS. 15A–15C, a central light-receiving area 22A and a peripheral light-receiving area 22B on the front surface thereof. The central and peripheral light-receiving areas 22A and 22B form a spatial arrangement of the rising-sun flag as shown in the figures. An original edge determining unit 123B receives a detection signal output by the distance-detection light-receiving unit 22. Using the received detection signal, the original edge determining unit 123B determines a position of an edge of the original paper sheet 5 with respect to the original placement table 3. Whether the light currently being received by the distance-detection light-receiving unit 22 is the light reflected by an edge of the original paper sheet 5 is determined, by the distance-detection light-receiving unit 22, as will be described later.

Figure 14:
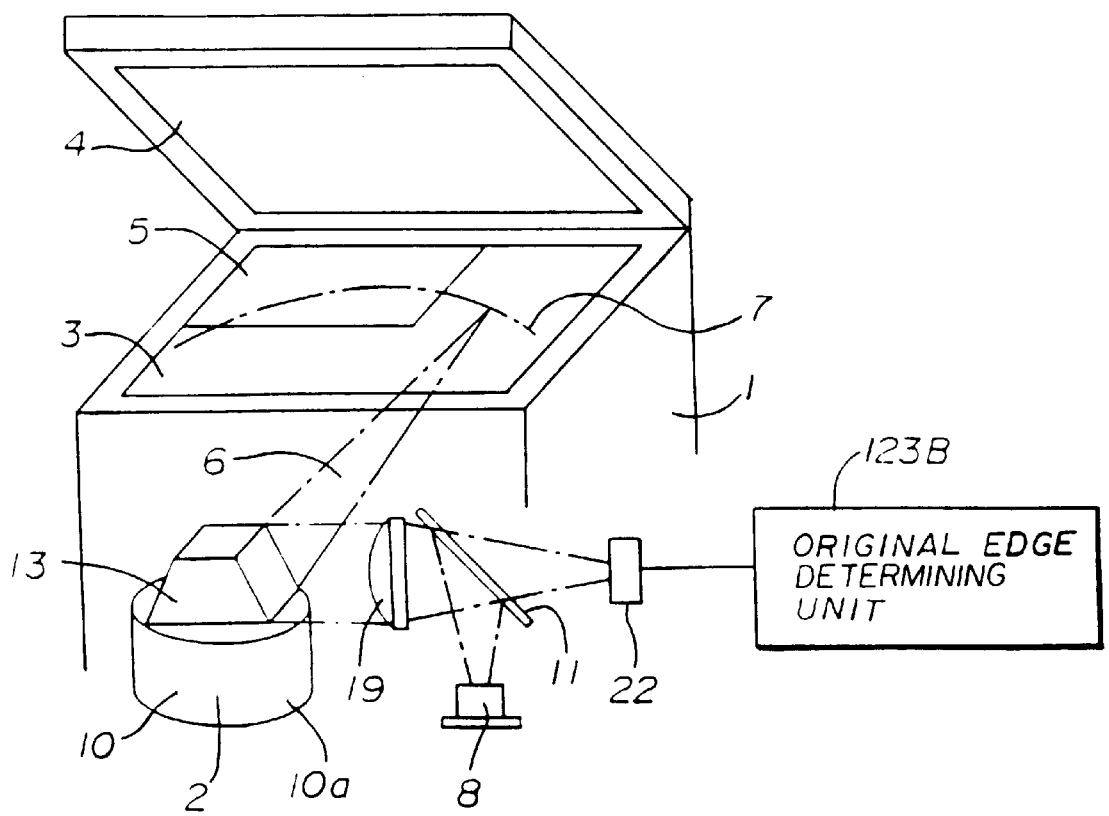
FIG. 14 illustrates an eighth embodiment of the present invention.

In this arrangement, in a condition in which the original pressing sheet 4 is in an open position as shown in FIG. 14, the light emitted by the light emitting diode 8 is used for scanning the original paper sheet 5 and the original pressing sheet 4 through the light scanning unit 2. As a result, the light is reflected by the original paper sheet 5 and the original pressing sheet 4. The thus-reflected light is incident on the distance-detection light-receiving unit 22. In addition, other disturbance light from room lightings and so forth is also incident on the distance-detection light-receiving unit 22. According to the principle of the well-known beam size method, a size of a spot S, shown in FIGS. 15A–15C, formed by the incident light on the distance-detection light-receiving unit 22 varies as a length of an incident-light path varies. The length of an incident-light path is a length of a light path through which the light comes to the distance-detection light-receiving unit 22 from a source such as the original paper sheet 5, original pressing sheet 4, or room lightings or the like from which disturbance light is emitted.

FIG. 15A shows a size of the spot S formed on the distance-detection light-receiving unit 22 when the length of the incident-light path is relatively short. As shown in the figure, the size of the spot S is relatively large. FIG. 15C shows a size of the spot S formed on the distance-detection light-receiving unit 22 when the length of the incident-light path is relatively long. As shown in the figure, the size of the spot S is relatively small. FIG. 15B shows a size of the spot S formed on the distance-detection light-receiving unit 22 when the length of the incident-light path is a middle length. As shown in the figure, the size of the spot S is a middle size. As shown in FIGS. 15A–15C, each spot S consists of two parts, each part being formed on a respective one of the two light-receiving areas 22A, 22B of the distance-detection light-receiving unit 22. The distance-detection light-receiving unit 22 has performance such that an output A or B from each of the two light-receiving areas 22A, 22B varies as an area of a respective part of the spot S formed thereon varies. Therefore, as the length of the incident-light path varies, the outputs A, B from the two light-receiving areas 22A, 22B vary, respectively. Specifically, as an area of the part of the spot S formed on each of the two light-receiving areas 22A, 22B increases, the output thereof increases. Therefore, the distance-detection light-receiving unit 22 uses the outputs A, B, and thus recognizes the length of the incident-light path of the light currently being incident on the distance-detection light-receiving unit 22.

For example, the focal lens 19 and distance-detection light-receiving unit 22 are positioned to have a predetermined spatial arrangement. In this condition, when the distance-detection light-receiving unit 22 receives the light which has been reflected from the original paper sheet 5 placed on the transparent original placement table 3, the length of the incident-light path is relatively short. As a result, according to the principle of the beam size method, similar to the case shown in FIG. 15A, a size of the spot is relatively large, and therefore an area of a part of the spot S formed on the central light receiving area 22A is smaller than an area of the other part of the spot S formed on the peripheral light receiving area 22B. Thereby, a magnitude of the output A is smaller than a magnitude of the output B (A<B).

When the distance-detection light-receiving unit 22 receives the light which has been reflected from the original pressing sheet 4 in the open position, the length of the incident-light path is relatively large. As a result, similar to the case shown in FIG. 15C, a size of the spot S is relatively small according to the principle of the beam size method, and therefore an area of a part of the spot S formed on the central light receiving area 22A is larger than an area of the other part of the spot S formed on the peripheral light receiving area 22B. Thereby, a magnitude of the output A is larger than a magnitude of the output B (A>B).

By positioning the focal lens 19 and distance-detection light-receiving unit 22 as described above according to the predetermined spatial arrangement, when the distance-detection light-receiving unit 22 receives other disturbance light originating from room lightings and or the like, a magnitude of the output A is also larger than a magnitude of the output B (A>B). This is because it can be determined that the length of the incident-light path when such disturbance light is incident is longer than the length of the incident-light path when the light reflected by the open-position original pressing sheet 4 is incident. Therefore, the distance-detection light-receiving unit 22 uses a condition, in which the two magnitudes of the outputs A and B are equal to each other (A=B), as a threshold condition for determining whether the light currently incident on the distance-detection light-receiving unit 22 is the light reflected by the original paper sheet 5 placed on the original placement table 3. The distance-detection light-receiving unit 22 determines that the light currently incident on the distance-detection light-receiving unit 22 is the light reflected by the original paper sheet 5 placed on the original placement table 3 when A<B. Then, the distance-detection light-receiving unit 22 outputs the detection signal.

By using this method, it is possible to positively determine whether the incident light is the light reflected by the original paper sheet 5 on the original placement table 3, even if light intensities received by the distance-detection light-receiving unit 22 are not remarkably different between the light reflected by the original paper sheet 4 on the original placement table 3, the light reflected by the open-position original pressing sheet 4 and other disturbance light. The detection signal output from the distance-detection light-receiving unit 22 and another predetermined signal output from the light scanning unit 2 are input to the original edge determining unit 123B. The predetermined signal from the light scanning unit 2 indicates a timing of the light scanning performed thereby. Using the detection signal from the distance-detection light-receiving unit 22, the original edge determining unit 123B can recognize a time when the light beam 6 is incident on an edge of the original paper sheet 5. Thus, by using the thus-detected time of the edge of the original paper sheet 5 and the timing of the light scanning, the original edge determining unit 123B can detect a position of the edge of the original paper sheet 5 with respect to the original placement table 3.

With reference to FIGS. 16, 17A, 17B and 17C, an original reading apparatus in a ninth embodiment of the present invention will now be described.

Figure 18:
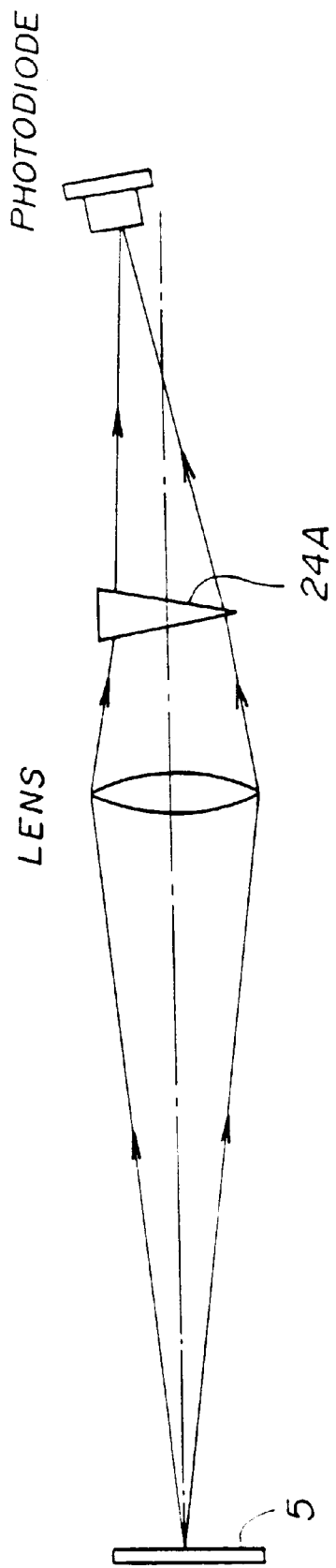
FIG. 18 illustrates a variation example of the ninth embodiment shown in FIG. 16.

In this embodiment, a distance-detection light-receiving unit 23 is used. The distance-detection light-receiving unit 23 has at least four light receiving areas $23A_1$, $23A_2$, $23B_1$ and $23B_2$ positioned to be symmetrical with a symmetrical center coincident with the center of the distance-detection light-receiving unit 23, as shown in FIGS. 17A–17C. Further, in front of the distance-detection light-receiving unit 23, the focal lens 19, the beam splitter 11 and a cylindrical lens 24 are provided in a predetermined spatial arrangement. In this arrangement, the focal lens 19 converges received light to the center of the distance-detection light-receiving unit 23. The cylindrical lens 24 is a lens which has power only in a single direction. In this embodiment, by providing the above-described arrangement, the length of the incident-light path is determined according to the well-known astigmatic method. Instead of using the cylindrical lens 24, it is possible to use a wedge prism 24A as shown in FIG. 18. In FIG. 18, an optical system in the arrangement shown in FIG. 16, including the mirror 13, lens 19, and beam splitter 11, is indicated as a single lens.

In this arrangement, in a condition in which the original pressing sheet 4 is in an open position as shown in FIG. 16, the light emitted by the light emitting diode 8 is used for scanning the original paper sheet 5 and the original pressing sheet 4 through the light scanning unit 2. As a result, the light is reflected by the original paper sheet 5 and the original pressing sheet 4. The thus-reflected light is incident on the distance-detection light-receiving unit 23. In addition, other disturbance light from room lightings and so forth is also incident on the distance-detection light-receiving unit 23. By providing the focal lens 19 and the cylindrical lens 24 in front of the distance-detection light-receiving unit 23, according to the principle of the well-known astigmatism method, as shown in FIGS. 17A–17C, a shape of a spot S formed by the incident light on the distance-detection light-receiving unit 23 varies as the length of an incident-light path varies. The length of an incident-light path is a length of a light path through which the light comes to the distance-detection light-receiving unit 23 from a source such as the original paper sheet 5, original pressing sheet 4, or room lightings or the like from which disturbance light is emitted. A similar effect can be obtained when the wedge prism 24A is used instead of the cylindrical lens 24 as shown in FIG. 18.

FIG. 16A shows a shape of the spot S formed on the distance-detection light-receiving unit 23 when the length of the incident-light path is relatively short. As shown in the figure, the shape of the spot S is a long circle such that the horizontal length is longer than the vertical length thereof. FIG. 17C shows a shape of the spot S formed on the distance-detection light-receiving unit 23 when the length of the incident-light path is relatively long. As shown in the figure, the shape of the spot S is a long circle such that the vertical length is longer than the horizontal length thereof. FIG. 17B shows a shape of the spot S formed on the distance-detection light-receiving unit 22 when the length of the incident-light path is a middle length. As shown in the figure, the shape of the spot S is an ordinary circle. As shown in FIGS. 17A–17C, each spot S consists of four parts, each part being formed on a respective one of the four light-receiving areas $23A_1$, $23A_2$, $23B_1$ and $23B_2$ of the distance-detection light-receiving unit 23.

The distance-detection light-receiving unit 23 has performance such that an output $A_1$, $A_2$, $B_1$ or $B_2$ from each of the four light-receiving areas $23A_1$, $23A_2$, $23B_1$ and $23B_2$ varies as an area of a respective part of the spot S formed thereon varies. When the length of the incident-light path is the middle length as shown in FIG. 17B, the spot S is the ordinary circle formed at the center of the distance-detection light-receiving unit 23. Therefore, areas of parts of the spot S formed on the four light receiving areas $23A_1$, $23A_2$, $23B_1$ and $23B_2$, respectively, are equal to each other. As a result, $A_1=A_2=B_1=B_2$. When the length of the incident-light path is relatively short, because the spot S is a horizontally elongated circle and therefore areas of parts formed on the light receiving areas $23A_1$ and $23A_2$ are smaller than areas of parts formed on the light receiving areas $23B_1$ and $23B_2$, as shown in FIG. 17A, $A_1+A_2<B_1+B_2$. In contrast to this, when the length of the incident-light path is relatively long, because the spot S is a vertically elongated circle and therefore areas of parts formed on the light receiving areas $23A_1$ and $23A_2$ are larger than areas of parts formed on the light receiving areas $23B_1$ and $23B_2$, as shown in FIG. 17A, $A_1+A_2>B_1+B_2$. Thus, as the length of the incident-light path varies, $A_1+A_2$ and $B_1+B_2$ vary respectively due to variation of the shape of the spot S.

Hereinafter, $A=A_1+A_2$; and $B=B_1+B_2$. For example, the focal lens 19, cylindrical lens 24 and distance-detection light-receiving unit 23 are positioned to have a predetermined spatial arrangement. In this condition, when the distance-detection light-receiving unit 23 receives the light which has been reflected from the original paper sheet 5 placed on the transparent original placement table 3, the length of the incident-light path is relatively short. As a result, according to the principle of the astigmatism method, similar to the case shown in FIG. 17A, a shape of the spot S is a horizontally elongated circle, and therefore areas of parts of the spot S formed on the horizontally arranged light receiving areas $23A_1$, $23A_2$ are smaller than areas of the other parts of the spot S formed on the vertically arranged light receiving areas $23B_1$, $23B_2$. Thereby, the output A is smaller than the output B (A<B).

When the distance-detection light-receiving unit 23 receives the light which has been reflected from the original pressing sheet 4 in the open position, the length of the incident-light path is relatively large. As a result, similar to the case shown in FIG. 17C, a shape of the spot S is a vertically elongated circle according to the principle of the astigmatism method, and therefore areas of parts of the spot S formed on the vertically arranged light receiving areas $23A_1$, $23A_2$ are larger than areas of the other parts of the spot S formed on the horizontally arranged light receiving areas $23B_1$, $23B_2$. Therefore, the output A is larger than the output B (A>B).

By positioning the focal lens 19, cylindrical lens 24 and distance-detection light-receiving unit 23 as described above according to the predetermined spatial arrangement, when the distance-detection light-receiving unit 23 receives other disturbance light originating from room lightings and or the like, the output A is also larger than the output B (A>B). This is because it can be determined that the length of the incident-light path when such disturbance light is incident is longer than the length of the incident-light path when the light reflected by the open-position original pressing sheet 4 is incident.

Therefore, the distance-detection light-receiving unit 23 uses a condition, in which the two magnitudes of the outputs A and B are equal to each other (A=B), as a threshold condition for determining whether the light currently incident on the distance-detection light-receiving unit 23 is the light reflected by the original paper sheet 5 placed on the original placement table 3. The distance-detection light-receiving unit 23 determines that the light currently incident on the distance-detection light-receiving unit 23 is the light reflected by the original paper sheet 5 placed on the original placement table 3 when A<B. Then, the distance-detection light-receiving unit 23 outputs the detection signal.

By using this method, it is possible to positively determine whether the incident light is the light reflected by the original paper sheet 5 on the original placement table 3, even if light intensities received by the distance-detection light-receiving unit 23 are not remarkably different between the light reflected by the original paper sheet 4 on the original placement table 3, the light reflected by the open-position original pressing sheet 4 and other disturbance light. The detection signal output from the distance-detection light-receiving unit 23 and another predetermined signal output from the light scanning unit 2 are input to the original edge determining unit 123C. The predetermined signal from the light scanning unit 2 indicates a timing of the light scanning performed thereby. Using the detection signal from the distance-detection light-receiving unit 23, the original edge determining unit 123C can recognize a time when the light beam 6 is incident on an edge of the original paper sheet 5. Thus, by using the thus-detected time of the edge of the original paper sheet 5 and the timing of the light scanning, the original edge determining unit 123C can detect a position of the edge of the original paper sheet 5 with respect to the original placement table 3.

Figure 19:
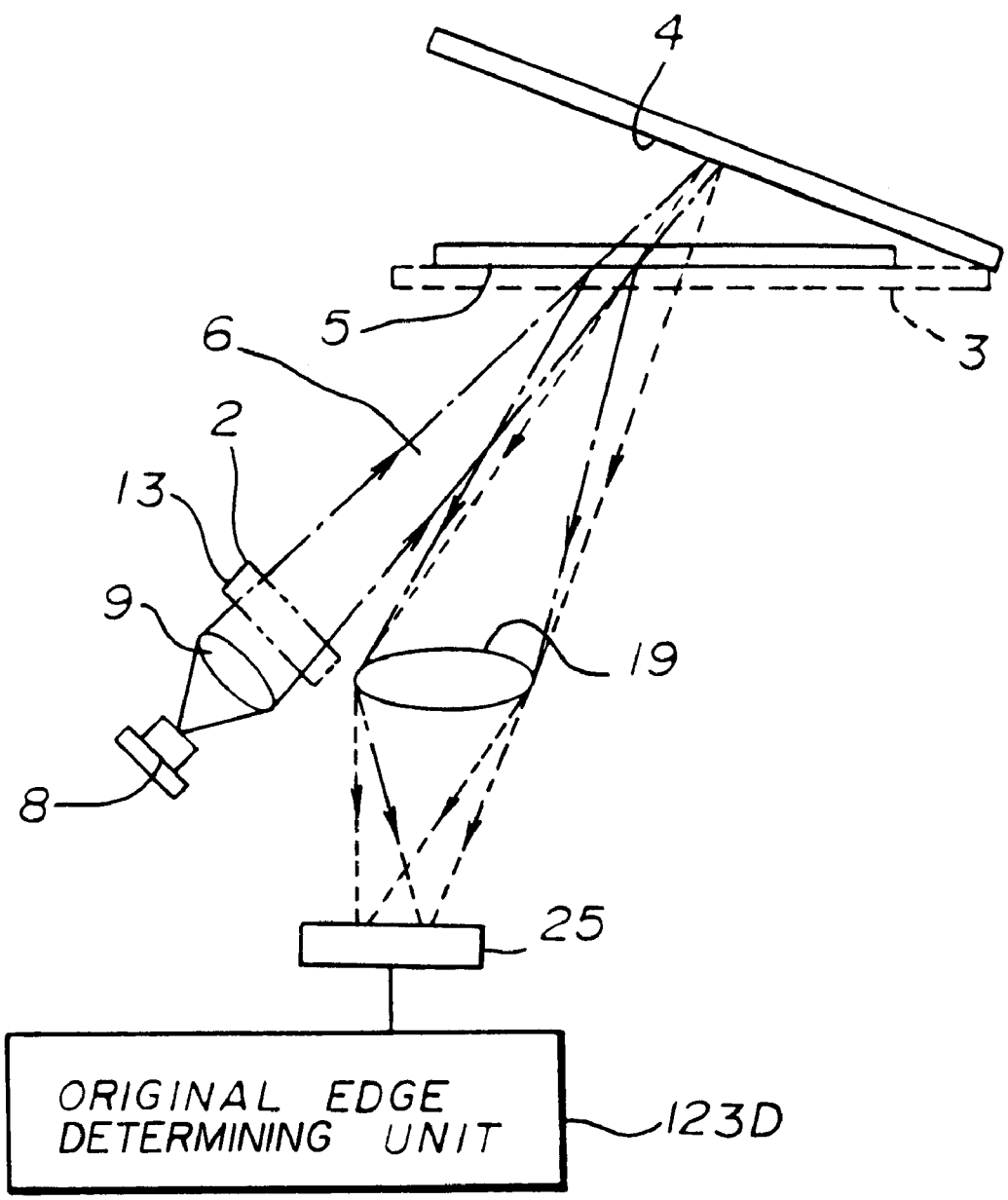
FIG. 19 illustrates a tenth embodiment of the present invention.
Figure 20:
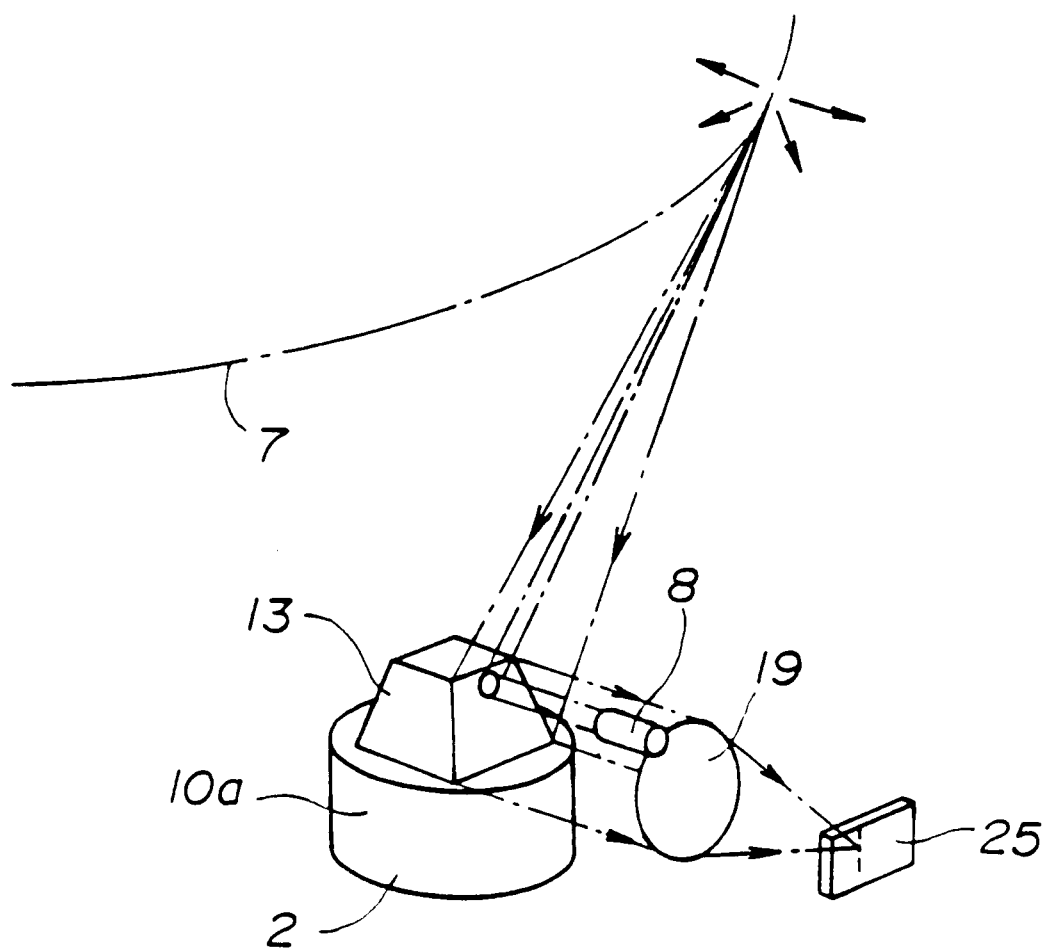
FIG. 20 shows a perspective view indicating a spatial relationship between a light scanning unit and a position-detection sensor in the tenth embodiment.
Figure 21:
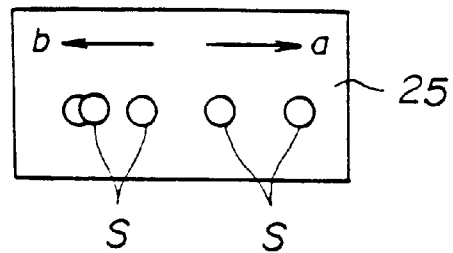
FIG. 21 illustrates variation of a spot formed on a position-detection sensor obtained as a length of an incident-light path varies in the tenth embodiment shown in FIG. 19.

With reference to FIGS. 19, 20 and 21, an original reading apparatus in a tenth embodiment of the present invention will now be described. This apparatus includes an original edge detecting system including a position-detection sensor 25, such as a position sensing device (PSD), acting as distance-detecting light-receiving means. The light beam 6 used for scanning through the light scanning unit 2 is reflected by the original paper sheet 5 or the open-position original pressing sheet 4. The reflected light is incident on the position-detection sensor 25. A position on which the reflected light is incident on the position-detection sensor 25 varies as the length of the incident-light path. As shown in FIG. 19, the light emitted by the light-emitting diode 8 is converged by the single lens 9 and then used to scan the original paper sheet 5 and the original pressing sheet 4 which then reflect the scanning light. The reflected, scattered light causes an image to be formed on the position-detection sensor 25 through the focal lens 19.

In this system, actually, as shown in FIG. 20, the light reflected by the original paper sheet 5 or the original pressing sheet 4 is incident on the position-detection sensor 25 via the mirror 13. The position-detection sensor 25 is provided at a position, on a plane on which the light-emitting diode 8 is also provided, but different from a position at which the light-emitting diode 8 is provided. This plane is a plane extending vertically in FIG. 20, and the light beam emitted by the light-emitting diode 8 lies in the same plane. Further, the rotation axis of the light scanning unit 2 also lies on the same plane.

In this arrangement, in a condition in which the original pressing sheet 4 is in the open position as shown in FIG. 19, the light emitted by the light emitting diode 8 is used for scanning the original paper sheet 5 and the original pressing sheet 4 through the light scanning unit 2. As a result, the light is reflected by the original paper sheet 5 and the original pressing sheet 4. The thus-reflected light is incident on the position-detection sensor 25. In addition, other disturbance light from room lightings and so forth is also incident on the position-detection sensor 25. As shown in FIG. 21, a position of the spot S formed by the incident light on the position-detection sensor 25 varies as the length of the incident-light path varies.

Specifically, as the length of the incident-light path decreases, the position at which the light is incident on the position-detection sensor 25 is shifted in a direction 'a'. As the length of the incident-light path increases, the position at which the light is incident on the position-detection sensor 25 is shifted in a direction 'b'. A voltage output by the position-detection sensor 25 varies as the position of the spot S formed thereon is shifted. Therefore, by measuring the voltage output by the position-detection sensor 25, an original edge determining unit 123D shown in FIG. 19 can recognize the current length of the incident-light path. Further, by comparing with a predetermined threshold level, for example, it is possible to detect whether the current incident light is light reflected by the original paper sheet 5 on the transparent original placement table 3.

The position-detection sensor 25 is provided on the plane in which the light beam emitted by the light-emitting diode 8 lies, as mentioned above. Thereby, the spot S scans on the position-detection sensor 25 linearly along a certain line segment as the length of the incident-light path varies. The position-detection sensor 25 outputs the voltage according to the position of the spot S on the position-detection sensor 25, as mentioned above. By using the voltage, the original edge determining unit 123D detects a time at which the light beam 6 is incident on an edge of the original paper sheet 5 on the original placement table 3. Then, by also using a signal indicating the scanning operation performed by the light scanning unit 2, the original edge determining unit 123D can detect a position of the edge of the original paper sheet 5 with respect to the original placement table 3.

Instead of using the light scanning unit 2 shown in FIGS. 17 and 18, it is also possible to provide means for moving a whole unit which includes the light-emitting diode 8, single lens 9, focal lens 19 and position-detection sensor 25, and thereby a scanning line 7 is formed on the original paper sheet 5 and the original pressing sheet 4. Further, the position-detection sensor 25 is not limited to the position sensing device (PSD). A line-type CCD sensor or a two-dimensional CCD sensor may also used for the same purpose.

Figure 22:
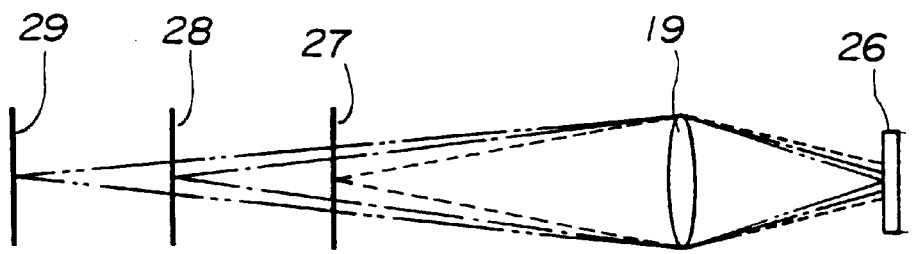
FIG. 22 illustrates an eleventh embodiment of the present invention.

With reference to FIG. 22, an original reading apparatus in an eleventh embodiment of the present invention will now be described.

The apparatus includes an original edge detecting system. In this system, instead of using the position-detection sensor 25 in the arrangement shown in FIGS. 19 and 20, a two-dimensional CCD sensor 26 is used acting as the distance-detection light-receiving means. The two-dimensional CCD sensor has thereon a two-dimensional light-receiving area. In the arrangement of the eleventh embodiment, as the length of the incident-light path varies, a size, a shape, a light-intensity distribution and so forth in a spot S formed on the two-dimensional light-receiving area of the CCD sensor 26 as a result of the reflected light being incident thereon vary. The length of the incident light path is a length between an object, which reflects the scanning light provided by the light scanning unit 2, and the two-dimensional CCD sensor 26.

In this system, three cases will now be considered in which objects which reflect the scanning light are reflection surfaces 27, 28 and 29, and thus the lengths of the incident-light paths to the two-dimentional CCD sensor 26 are short, middle and long, respectively. A size of the spot formed on the two-dimensional CCD sensor 26 varies as a reflection surface used is changed between the reflection surfaces 27, 28 and 29. By detecting this spot-size variation, it is possible to positively determine whether the received light comes from the reflection surfaces 27, 28 or 29. By using this principle, it is, also possible to positively determine whether the received light comes from the original paper sheet 5 or the original pressing sheet 4, or the received light is disturbance light coming from room lightings and so forth. This is because, when the light is light coming from the original paper sheet 5, the length of the incident-light path is relatively short. In contrast to this, when the light is light coming from the original pressing sheet 4 or the light is disturbance light coming from room lightings or the like, the length of the incident-light path is relatively long.

Figures 23A, 23B:
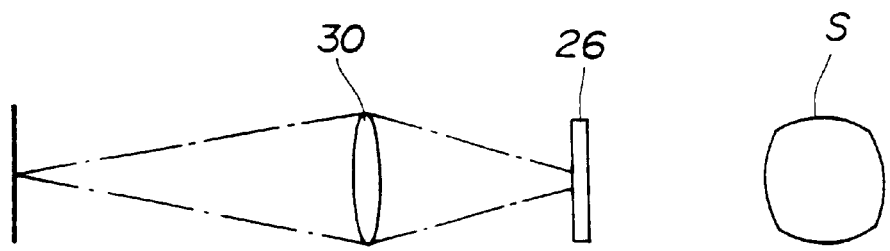
FIGS. 23A and 23B illustrate a twelfth embodiment of the present invention.

With reference to FIGS. 23A, 23B, 24A and 24B, an original reading apparatus in a twelfth embodiment of the present invention will now be described. The apparatus includes an original edge detecting system. This system uses a rectangular lens 30 as a converging lens together with the above-described two-dimensional CCD sensor 26. The rectangular lens is rectangular when viewed along the incident light direction. The rectangular lens 30 and the CCD sensor 26 are arranged appropriately so that, when the length of the incident-light path is relatively short, as shown in FIG. 23A, a shape of the resulting spot S on the CCD sensor 26 is a shape, similar to a square, but a central portion of each of four sides thereof outwardly project as shown in FIG. 23B. In contrast to this, when the length of the incident-light path is relatively long, as shown in FIG. 24A, a shape of the resulting spot S on the CCD sensor 26 is a shape, similar to a square, but a central portion of each of four sides thereof inwardly project as shown in FIG. 24B. Such a shape variation is detected through the two-dimensional CCD sensor 26. Thereby, it is possible to positively determined whether the received light comes from the original paper sheet 5 as a result of detecting the length of the incident-light path.

Figure 25A:
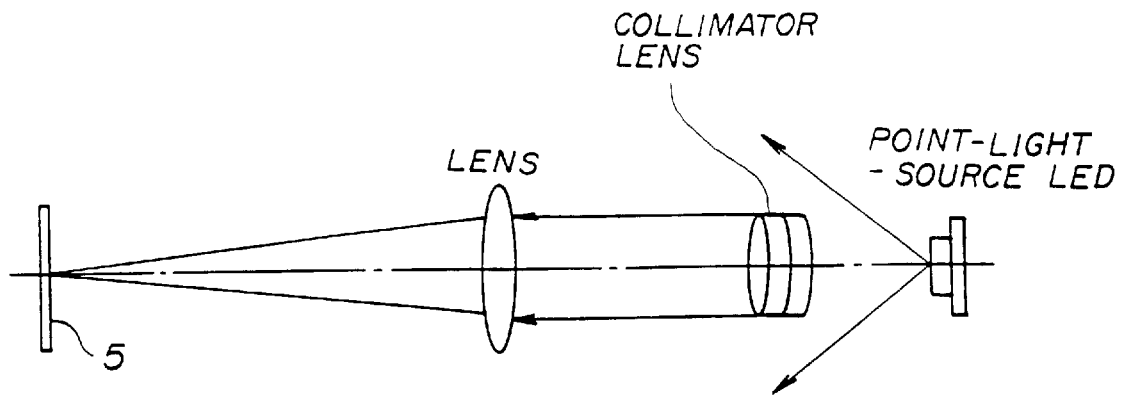
FIGS. 25A, 25B and 25C show a thirteenth embodiment of the present invention, FIG. 25A showing an example using a collimator lens, FIG. 25B showing an example using an aperture and FIG. 25C showing a light-intensity distribution in a spot on an original paper sheet or an original pressing sheet in the arrangement shown in FIG. 25A or 25B.
Figure 25B:
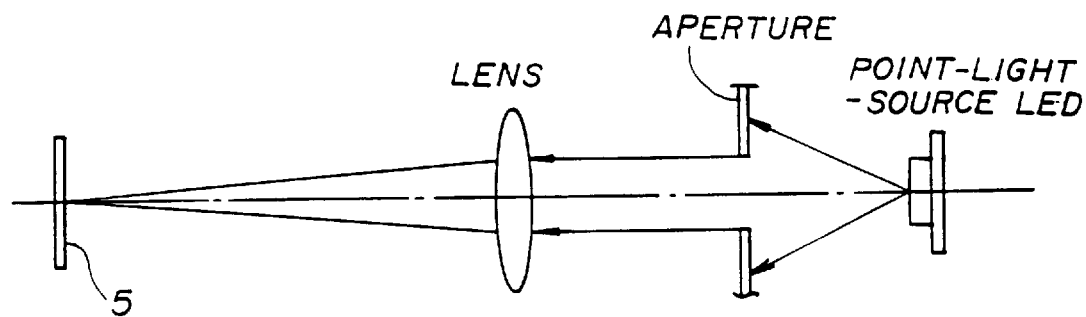
Figure 25C:
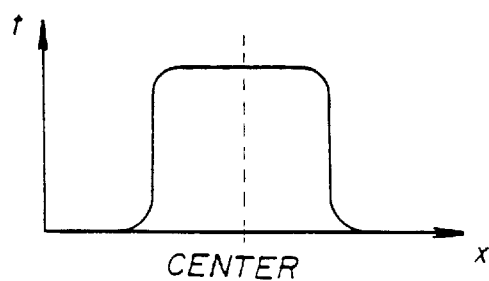

With reference to FIGS. 25A, 25B, 25C, 26A, 26B, 26C and 26D, an original reading apparatus in a thirteenth embodiment of the present invention will now be described. The apparatus includes an original edge detecting system. The system uses a collimator lens (as shown in FIG. 25A) or an aperture (as shown in FIG. 25B) which is provided in a light path in the system together with the above-described two-dimentinal CCD sensor 26. In each of FIGS. 25A and 25B, an optical system, such as that in the arrangement shown in FIG. 16, including the mirror 13, lens 19, and beam splitter 11, is indicated as a single lens. By providing the collimator lens in the light path, because the diameter of the collimator lens is limited, an outer portion of an incident light beam is eclipsed thereby. Similarly, by providing the aperture in the light path, an outer portion of an incident light beam is eclipsed thereby.

Figure 26A:
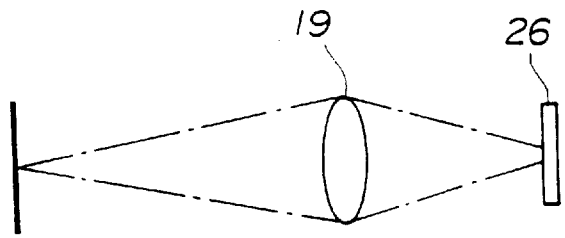
FIG. 26A shows a light path when an incident-light path length is relatively short in the arrangement shown in FIGS. 25A or 25B.
Figure 26B:
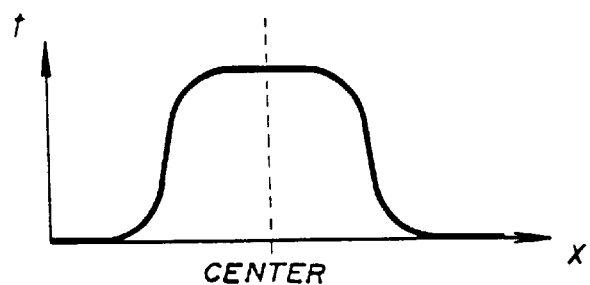
FIG. 26B shows a light-intensity distribution in a spot in the condition shown in FIG. 26A.
Figure 26C:
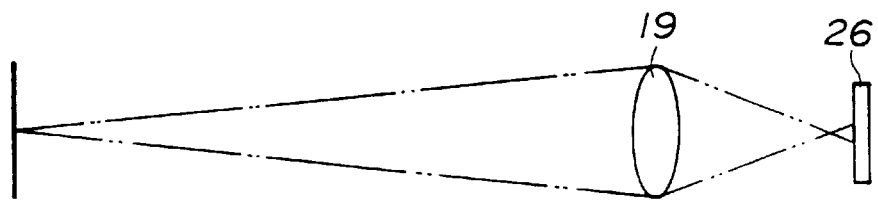
FIG. 26C shows a light path when an incident-light path length is relatively long in the arrangement shown in FIG. 25A or 25B.
Figure 26D:
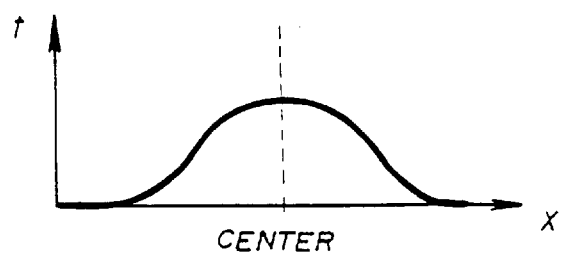
FIG. 26D shows a light-intensity distribution in a spot in the condition shown in FIG. 26C.

By using such phenomena, the system in the thirteenth embodiment has an arrangement such that, when the length of the incident-light path is relatively short as shown in FIG. 26A, a light-intensity distribution of the resulting spot on the CCD sensor 26 is such as that shown in FIG. 26B. In contrast to this, when the length of the incident-light path is relatively long, as shown in FIG. 26C, a light-intensity distribution of the resulting spot on the CCD sensor 26 is such as that shown in FIG. 26D. By using waveforms of signals output by the CCD sensor 26 such as those shown in FIGS. 26B and 26D, it is possible to recognize the current length of the incident-light path. Thereby, it is possible to positively determined whether the received light comes from the original paper sheet 5 as a result of detecting the length of the incident-light path.

The point-light-source LED (Light-Emitting Diode) shown in FIGS. 25A and 25B has coherence. Due to the eclipse of the collimator lens or the aperture, a light-intensity distribution of the light beam incident on the original paper sheet 5 or the original pressing sheet 4, after the light beam emitted by the point-light-source LED passing through the collimator lens or the aperture, is one such as that shown in FIG. 25C. Then, the light beam having such a light-intensity distribution, after being reflected by the original paper sheet 5 or the original pressing sheet 4, is incident on the CCD sensor 26 shown in FIGS. 26A and 26C as mentioned above. When the light beam is reflected by the original paper sheet 5 or the original pressing sheet 4, the light beam scatters. When the reflected light beam is incident on the sensor 26 as shown in FIG. 26A where the light beam is incident on the sensor short of the focal point thereof, the light beam has the light-intensity distribution such as that shown in FIG. 26B which is blunt from but similar to the distribution shown in FIG. 25C. When the reflected light beam is incident on the sensor 26 as shown in FIG. 26C where the light beam is incident on the sensor ahead of the focal point thereof, the light beam has the light-intensity distribution such as that shown in FIG. 26D which is further blunt from the distribution shown in FIG. 26B due to aberration.

In any of the above-described eleventh, twelfth and thirteenth embodiments, whether the received light comes from the original paper sheet 5 is detected by using a size, a shape or a light-intensity distribution of the resulting spot. In any of these embodiments, by further using a signal indicating the scanning operation performed by a light scanning unit such as the above-described unit 2, an original edge determining unit can detect a position of the edge of the original paper sheet 5 with respect to an original placement table such as the above-mentioned table 3.

An original reading apparatus in a fourteenth embodiment will now be described. The apparatus includes an original edge detecting system. In this system, any one of the distance-detection light-receiving units 20, 22 and 23 shown in FIGS. 12, 13A–13C, 14, 15A–15C, 16 and 17A–17C, each unit having two or four light receiving areas provided on the front surface thereof may be used.

In the system, a predetermined value is subtracted from first one of the above-mentioned output A and output B of the distance-detection light-receiving unit. This predetermined value is a bias component of the first one of the output A and output B, which bias component is a noise component, such as disturbance light, but originating from light emitted by the light-emitting diode 8. Similarly, a predetermined value is subtracted from a second one of the above-mentioned output A and output B of the distance-detection light-receiving unit. This predetermined value is also a bias component of the second one of the output A and output B, which bias component is a noise component, such as disturbance light, but originating from light emitted by the light-emitting diode 8. Then, the result of subtracting the bias component from the second one of the output A and output B is multiplied with a predetermined coefficient. Then, the result of the multiplication is compared with the above-mentioned result of subtracting the bias component from the first one of the output A and output B. Thus, whether the currently received light is one reflected by the original paper sheet 5 is determined.

The above-mentioned bias components of the output A and output B may be determined either by setting predetermined fixed values or by using a current intensity of light emitted by the light-emitting diode 8 which may be monitored by a special light intensity monitor.

Figure 27:
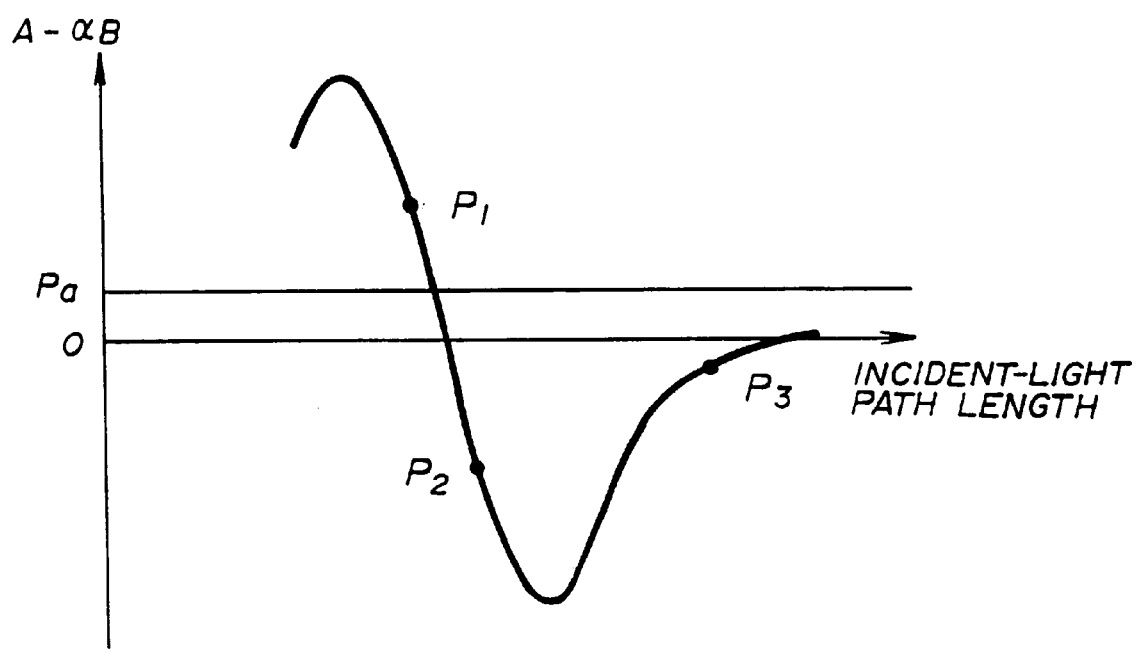
FIG. 27 illustrates a fourteenth embodiment of the present invention, and shows a relationship between a value A-αB (obtained from outputs of a distance-detection light-receiving unit and a length of an incident-light path.

For example, the ninth embodiment is described under a condition where the arrangement using the astigmatism method, shown in FIGS. 16, 17A–17C is used. In this example, the above-mentioned outputs $A_1, A_2, B_1$ and $B_2$ of the light receiving areas $23A_1, 23A_2, 23B_1$ and $23B_2$ are obtained when light is reflected by an object located at a point of substantial infinity. Then, the coefficient $\alpha$ is obtained by a ratio A/B, where $A=A_1+A_2$, and $B=B_1+B_2$. FIG. 27 shows a variation of a value, A-$\alpha$B when the length of the incident-light path varies. A value of A-$\alpha$B at a point $P_1$ shown in the figure corresponds to an actual value when the light is reflected by the original paper sheet 5. A value of A-$\alpha$B at a point $P_2$ shown in the figure corresponds to an actual value when the light is reflected by the original pressing sheet 4. A value of A-$\alpha$B at a point $P_3$ shown in the figure corresponds to an actual value when the light is reflected by an object located at a point of substantial infinity or disturbance light due to room lighting or the like.

As shown in FIG. 27, the value A-$\alpha$B, at $P_3$, resulting when the light is reflected by an object located at a point of substantial infinity or from disturbance light due to room lighting or the like, is close to 0. Therefore, it is problematic that the value 0 is used as a threshold value when it is determined whether or not the light is one reflected by the original paper sheet 5. Therefore, instead of 0, a value, Pa, slightly larger than 0 is used as the threshold value. Then, when the value, A-$\alpha$B is larger than the value Pa, it is determined that the light is one reflected by the original paper sheet 5. When the value, A-$\alpha$B is smaller than the value Pa, it is determined that the light is not one reflected by the original paper sheet 5. Thereby, it is possible to surely detect edges of the original paper sheet 5 in the manner described above in the previously described embodiments.

In conjunction with the fourteenth embodiment, it is possible to eliminate an influence of a weak disturbance light coming from a remote object in a method in which a value A-B (resulting from subtracting the above-mentioned output B from the above-mentioned output A) is obtained, and a value slightly larger than 0 as the threshold value is used for the above-mentioned determination. However, it is possible that strong disturbance light coming from room lightings such as fluorescent lights or the sun is directly incident on the distance-detection light-receiving unit. In such a case, the light intensity is so strong that the value A-B may be an extremely positive value or an extremely negative value. However, a ratio A/B (resulting from dividing the output A with the output B) may be approximately a value when the length of the incident-light path is very long, such as a case where the light-incident path starts from a point of substantially infinity, even if absolute values of A and B are very large, and this value is approximately the above-mentioned $\alpha$. Further, a ratio A/B obtained when the incident light is one reflected by the original paper sheet 5 is referred to as $\beta$. Then, a coefficient $\alpha'$ may be determined such that $\alpha<\alpha'<\beta$. Thereby, when A/B>$\alpha'$, it is determined that the incident light is one reflected by the original paper sheet 5. When A/B<$\alpha'$, it is determined that the incident light is not one reflected by the original paper sheet 5. In this case, when the incident light is one reflected by the original pressing sheet 4, A/B<$\alpha$.

When this determination method is achieved, producing an electronic circuit performing a division operation of the ratio A/B requires a relatively complicated circuit. Therefore, instead of calculating the ratio A/B, the value, A-$\alpha$B, is obtained. Then, as described above, when the value, A-$\alpha$B is larger than the value Pa, it is determined that the light is one reflected by the original paper sheet 5. When the value, A-$\alpha$B is smaller than the value Pa, it is determined that the light is not one reflected by the original paper sheet 5.

Figure 28:
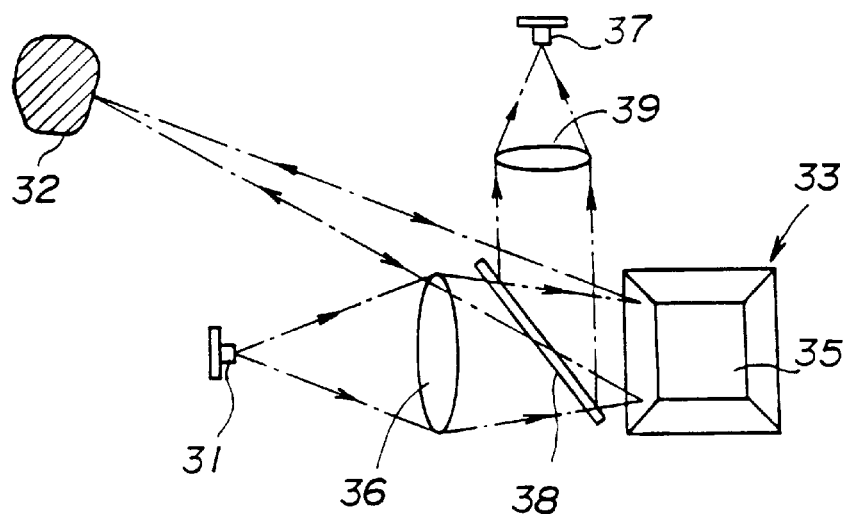
FIG. 28 shows an optical path arrangement in an optical sensor in a fifteenth embodiment of the present invention.
Figure 29:
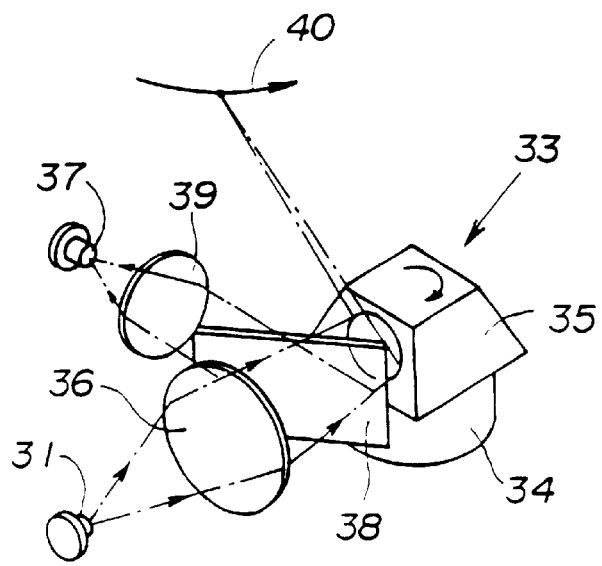
FIG. 29 shows a perspective view of the optical sensor shown in FIG. 28.
Figure 30:
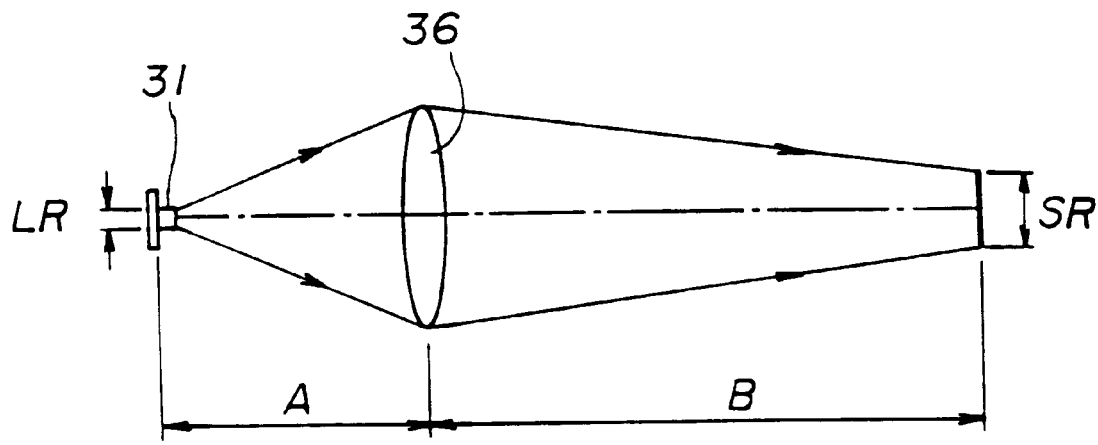
FIG. 30 shows a light converging condition from a light-emitting diode to a to-be-detected object.

With reference to FIGS. 28, 29 and 30, an optical sensor in a fifteenth embodiment of the present invention will now be described. FIG. 28 shows an optical-path arrangement in the optical sensor, FIG. 29 shows a perspective view of the optical sensor and FIG. 30 illustrates a light converging condition of light emitted by a light-emitting diode and incident on a to-be-detected object.

A light-emitting diode 31 is used in the optical sensor and is a common, inexpensive one which is widely used. A diameter LR, shown in FIG. 30, of a light-emitting surface of the light-emitting diode 31 is approximately 0.3 mm.

A light scanning mechanism 33 is provided in the optical sensor. The light scanning mechanism 33 deflects light emitted by the light-emitting diode 31, and causes the light to scan for the to-be-detected object 32. The light scanning mechanism 33 includes a motor 34 and a polygon mirror 35 directly coupled with a rotating shaft of the motor 34. However, another type of the light scanning mechanism 33 can be used instead. For example, a vibrating mirror or prism may be used to cause incident light to scan. Alternatively, a rotating hologram disc may be used to cause incident light to scan. However, it is noted that, if the rotating hologram disc is used, a diameter of a light beam used for the scanning operation is larger in comparison to the case where the deflection for the scanning operation is performed through a mirror.

Between the light-emitting diode 31 and the light scanning mechanism 33, a converging optical system 36 and a beam splitter 38 are provided. The converging optical system 36 converges light emitted by the light-emitting diode 31 onto the to-be-detected object 32. The beam splitter 38 receives light which has been reflected by the to-be-detected object 32 and then is returning along a retroreflection path. The beam splitter 38 reflects part of the received light. The light reflected by the beam splitter 38 is incident on a light receiving unit (detector) 37.

In this example, the converging optical system 36 includes a single lens. However, instead, the converging optical system 36 may include a combination of a plurality of lenses. The converging optical system 36 is located between the light-emitting diode 31 and the beam splitter 38.

Further, another converging optical system 39 is provided. The converging optical system 39 receives light reflected by the beam splitter 38 and converges the received light onto the light receiving unit 37. In this example, the converging optical system 39 includes a single lens. However, instead, the converging optical system 39 may include a combination of a plurality of lenses.

In the above-described arrangement, light emitted by the light-emitting diode 31 is caused to converge through the converging optical system 36, and performs the scanning operation through the polygon mirror 35 of the light scanning mechanism 33. If the to-be-detected object 32 is present on a scan line 40 shown in FIG. 29, light reflected by the to-be-detected object 32 returns through the retroreflection path through which the light has been incident on the to-be-detected object 32. The scan line 40 is a line along which a focus of the light beam emitted from the polygon mirror 35 moves in the scanning operation.

The light reflected by the to-be-detected object is incident on the polygon mirror 35 which then reflects the incident light to the rear surface of the beam splitter 38. Part of the incident light is reflected by the beam splitter 38 and received by the converging optical system 39 which then converges the received light. The converged light is incident on the light receiving unit 37. The light receiving unit 37 outputs a signal indicating intensity of the incident light. Intensity of light received by the light receiving unit 37 differs between a case where the light has been reflected by the to-be-detected object and a case where the light is other scattered light. Therefore, by using a predetermined threshold level, the received light intensity is converted into either one of two values, one value corresponding to the case where the light has been reflected by the to-be-detected object and the other value corresponding to the case where the light is the other scattered light. Thus, whether a to-be-detected object 32 is present in a position or not is determined. The position at which light emitted from the polygon mirror 35 is currently converging for a to-be-detected object 32 in the scanning operation is determined from a current rotation angle of the polygon mirror 35.

In the case where whether or not a to-be-detected object is present at a position is determined, different from a case where image information such as that of characters is recognized, it is not necessary to use a light beam having a very small cross-section area. In one example, a scanning light-spot diameter SR on a to-be-detected object should be an order of several millimeters. This scanning light-spot diameter SR is achieved as a result of the converging optical system 36 appropriately converging light emitted by the light-emitting diode 31. As shown in FIG. 30, the scanning light-spot diameter SR is obtained by the following equation:

$$SR = LR \cdot B/A,$$

where LR represents the diameter of the light-emitting surface of the light-emitting diode 31, as mentioned above, 'A' represents an optical-path length between the light-emitting diode 31 and the converging optical system 36, and 'B' represents an optical-path length between the converging optical system 36 and the to-be-detected object 32.

When this optical sensor is incorporated in an apparatus, it is preferable that a space required for the optical sensor is small. If a total optical-path length of the optical sensor is set to be 300 to 400 mm, it is possible that light emitted by the light-emitting diode 31 is converged on a to-be-detected object 32 with the scanning light-spot diameter SR of several millimeters.

It is possible that a light-emitting diode on the market which has a light-emitting surface diameter of approximately 0.3 mm is used as the abovementioned light-emitting diode 31. A light-emitting diode on the market which has a light-emitting surface diameter of approximately 0.3 mm may not have a superior directivity and may have characteristics of emitting light which spreads widely. Therefore, light emitted may not be used efficiently. In order to solve this problem, it is necessary to use the lens system having a large NA (Numerical Aperture).

In the optical sensor shown in FIG. 28, as shown in the figure, light emitted by the light-emitting diode 31 is caused to converge through the converging optical system 36 with a relatively wide cross-section area. That is, in the course of the optical path, a cross-section area of the light beam is relatively large. Therefore, a value of NA of the lens system of the optical sensor is relatively large and thereby light emitted by the light-emitting diode 31 can be efficiently used to become incident on the to-be-detected object 32.

Further, the beam splitter 38 which partially reflects light reflected by the to-be-detected object 32 is located in a position in which a cross-section area of light beam is relatively large. As a result, it is possible to cause the light reflected by the to-be-detected object 32 to be efficiently incident on the converging optical system 39 for the light-receiving unit 37. Thereby, it is possible to improve an accuracy in detecting a to-be-detected object 32.

In the optical sensor in the fifteenth embodiment, the light-emitting diode 31 is used as a light source which is used for detecting a to-be-detected object 32, as mentioned above. As a result, fulfillment of any safety regulation is not necessary therefor and thus it is not necessary to provide any device for fulfilling safety regulations. Further, the light-emitting diode is an inexpensive item on the market. Thus, costs are effectively lowered.

Further, in the optical sensor in the fifteenth embodiment, the converging optical system 36 which causes light emitted by the light-emitting diode 31 to converge on a to-be-detected object 32 is located between the light-emitting diode 31 and the beam splitter 38. Further, the converging optical system 39 which causes light reflected by a to-be-detected object 32 to converge on the light receiving unit 37 is located between the beam splitter 38 and the light receiving unit 37. Thereby, the converging optical system 36 which causes the light emitted by the light-emitting diode 31 to converge on the to-be-detected object 32 is separated from the converging optical system 39 which causes light reflected by the to-be-detected object 32 to converge on the light receiving unit 37.

Thereby, by using a lens having a large NA value in the converging optical system 36 which causes light from the light-emitting diode 31 to converge on the to-be-detected object 32, it is possible to improve efficiency in using light from the light-emitting diode 31. Simultaneously, by using a lens having a long focal length as the converging optical system 39 which causes reflected light from the to-bedetected object 32 to converge, it is possible to cause the reflected light from the to-be-detected object 32 to have a desired focus on the light receiving unit 37, and to cause reflected light from any objects other than the to-be-detected object 32 not to have a desired focus on the light receiving unit 37.

The optical sensor in the fifteenth embodiment can be applied to the original reading apparatus such as that of one of the above-described first through sixth embodiments of the present invention. In such a case, the optical sensor is used for detecting edges of an original paper sheet 5 placed on a contact glass (original placement table 3). In such a case, light reflected by various walls inside the apparatus other than the contact glass is incident on the light receiving unit 37 in addition to reflected light from the original paper sheet 5 (to-be-detected object 32). However, by determining a location and a focal length of the converging optical system 39 so that reflected light from the original paper sheet 5 has a desired focus on the light receiving unit 37, it is possible to cause intensity of light reflected by the original paper sheet 5 to have an especially high level. Thereby, it is possible to improve an accuracy in detecting edges of the original paper sheet 5. In this case, it is further effective that an aperture (not shown in the figures) is formed in a front surface of the light receiving unit 37.

Figure 31:
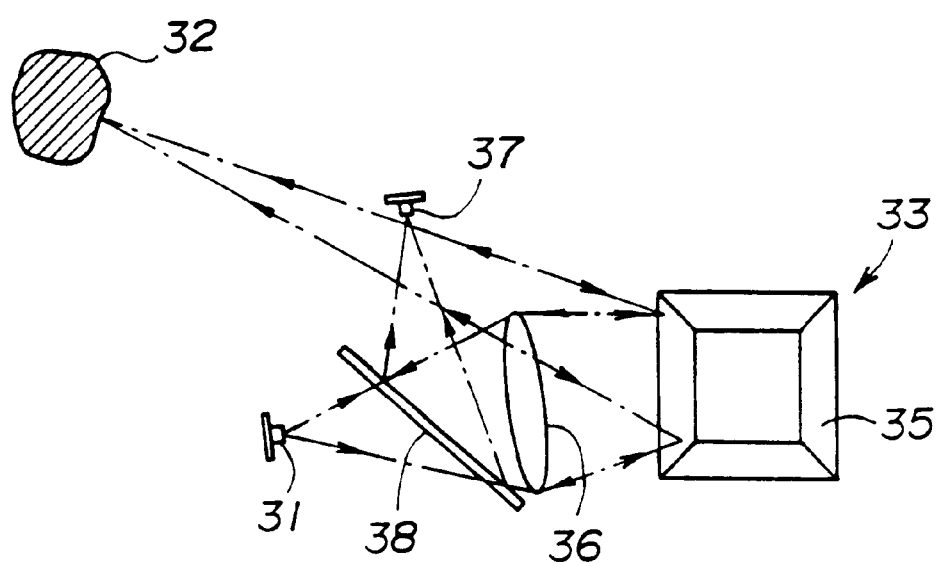
FIG. 31 shows an optical path arrangement in an optical sensor in a sixteenth embodiment of the present invention.

With reference to FIG. 31, an optical sensor in a sixteenth embodiment of the present invention will now be described. FIG. 31 shows an optical path arrangement in the optical sensor. For elements identical to those of the above-described optical sensor in the fifteenth embodiment, the same reference numerals are given and descriptions thereof will be omitted. A similar manner is also applied to a description of the subsequent embodiment. In the sixteenth embodiment, different from the fifteenth embodiment, the converging optical system 36 is located between the beam splitter 38 and the light scanning mechanism 33.

Thereby, the common converging optical system 36 is used for causing light emitted by the light-emitting diode 31 to converge on the to-be-detected object 32 and for causing light reflected by the to-be-detected object 32 to converge on the light receiving unit 37. As a result, a number of the converging optical systems can be reduced to one, and thereby costs are lowered. Further, it is also possible to miniaturize the optical sensor.

Figure 32A:
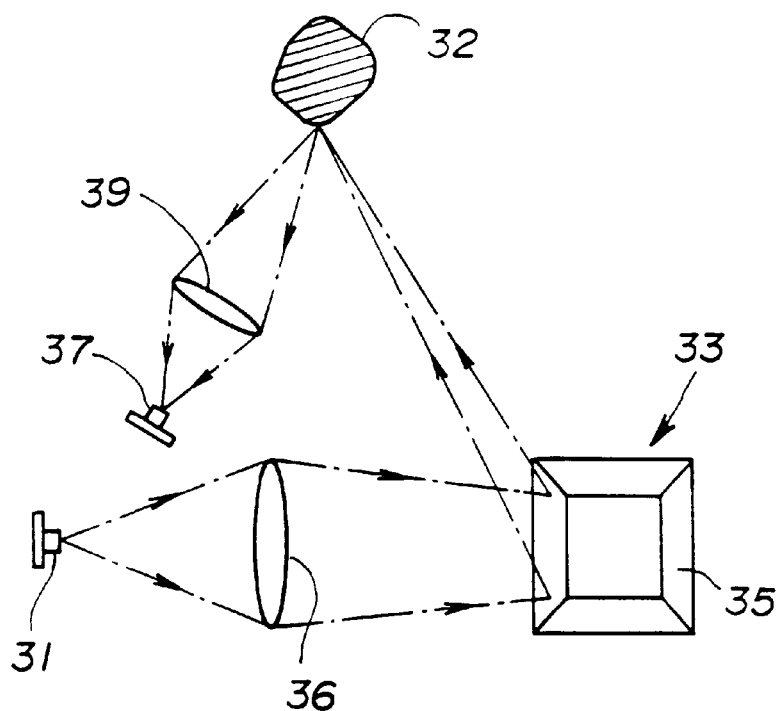
FIG. 32A shows an optical path arrangement in an optical sensor in a seventeenth embodiment of the present invention.

With reference to FIG. 32A, an optical sensor in a seventeenth embodiment of the present invention will now be described. FIG. 32A shows an optical path arrangement of the optical sensor. In this optical sensor, light from the light-emitting diode 31 is caused to converge by the converging optical system 36, and is used for the scanning operation on a to-be-detected object 32 through the polygon mirror 35 of the light scanning mechanism 33. The converging optical system 39 is located in a reflected-light optical path which is different from the scanning-light optical path along which the light scanning operation with light from the light-emitting diode 31 is performed on the to-be-detected object 32. The converging optical system 39 causes light reflected by the to-be-detected object 32 to converge and to be incident on the light receiving unit 37.

Also in this arrangement, similar to cases of above-described embodiments, an inexpensive light-emitting diode on the market is used as the light-emitting diode 31 and thereby a desired light-spot (light-beam cross-section) diameter appropriate for a to-be-detected object 32 can be provided. Further, in the seventeenth embodiment, different from the above-described fifteenth and sixteenth embodiments, no beam splitter is used in the optical path from the light-emitting diode 31 to the to-be-detected object 32, as shown in FIG. 32A. In the arrangement shown in FIG. 32A, reflected light from the to-be-detected object 32 is not partially reflected but is directly incident on the converging optical system 39 for the light receiving unit 37. As a result, it is possible to efficiently use light emitted by the light-emitting diode 31.

In the arrangement shown in FIG. 32A, scattered light reflected by the to-be-detected object 32 is used, and disturbance light may also be incident on the light receiving unit 37 in relation to a location thereof. However, light reflected by the to-be-detected object 32 after being emitted by the light-emitting diode 31 is incident on the light receiving unit 37 without fail. Therefore, a method can be applied, in which the light-emitting diode 31 is intermittently activated, and whether or not a to-be-detected object 32 is present in a position can be accurately detected by using a difference between an intensity of light received by the light receiving unit 37 when the light-emitting diode 31 emits light and another intensity of light received by the light receiving unit 37 when the light-emitting diode 31 does not emit light.

Figure 32B:
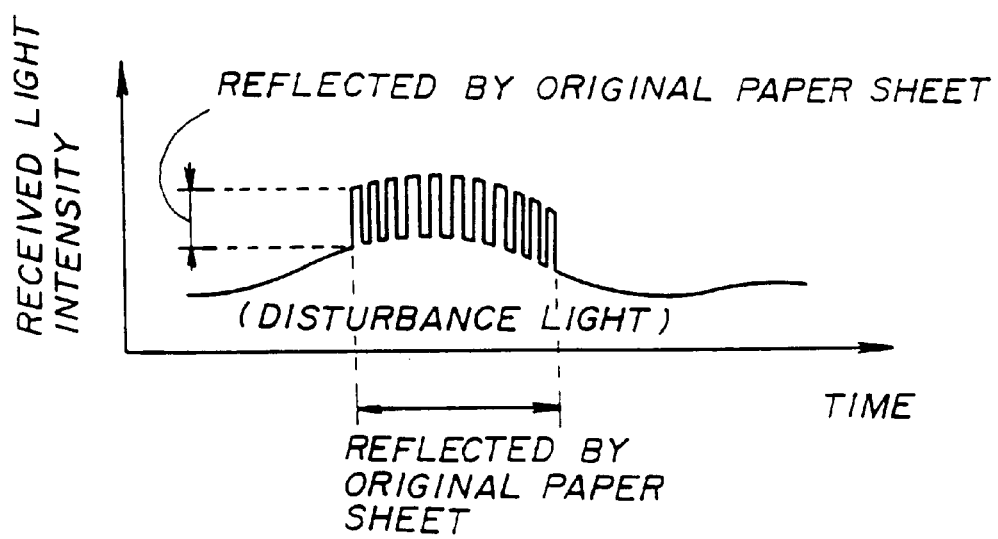
FIG. 32B illustrates an operation of the seventeenth embodiment of the present invention.

As shown in FIG. 32B, due to a general property of disturbance light, an intensity of received light resulting from the disturbance light does not substantially vary and substantially has a constant value although light is intermittently emitted from the light-emitting diode 31 as mentioned above. The disturbance light is light which results from light which is emitted by various source such as the sun, room lighting of an office room and so forth including the light-emitting diode 31 being randomly reflected by various things other than the to-be-detected object 32. In contrast to this, an intensity of received light which has been reflected by the to-be-detected object 32 clearly varies according to the intermittent light emitted by the light-emitting diode 31. Thus, when the light-emitting diode 31 emits light to the to-be-detected object 32, a light intensity resulting from the emitted light being reflected by the to-be-detected object 32 is added to the approximately constant light intensity due to the disturbance light. When no light is emitted by the light-emitting diode 31, no intensity is added to the approximately constant light intensity due to the disturbance light. Therefore, variation of the received light intensity forms a pulse waveform according to the intermittent light emitting by the light-emitting diode 31, as shown in FIG. 32B.

The embodiments of the present invention have been described for individually embodying concepts of the present invention. However, it is also possible to embody the present invention in a manner in which a plurality of concepts of the present invention are combined. For example, the method of any of the first and third embodiments for determining an instance when an edge of an original paper sheet is scanned can be combined with any of the arrangements shown in FIGS. 6, 7, 8, 9, 10, 28, 30, 31 and 32. As mentioned above, any optical sensor described above can be used for determining edges of an original paper sheet treated as a to-be-detected object.

Further, the present invention is not limited to the above-described embodiments, and variations and modifications may be made without departing from the scope of the present invention.

What is claimed is:

1. An optical sensor comprising:
   a light scanning mechanism which causes light emitted by a light-emitting diode to scan for a to-be-detected object;
   a converging optical system which causes the light emitted by said light-emitting diode to converge on the to-be-detected object;

a beam splitter which partially reflects the light which has been reflected by the to-be-detected object, the reflected light being incident on light receiving means; and another converging optical system which causes the light reflected by said beam splitter to converge on said light receiving means.

2. An optical sensor comprising:

a light scanning mechanism which causes light emitted by a light-emitting diode to scan for a to-be-detected object;

a converging optical system which causes the light emitted by said light-emitting diode to converge on the to-be-detected object; and a beam splitter which partially reflects the light which has been reflected by the to-be-detected object, the reflected light being incident on light receiving means, wherein said converging optical system further causes the light reflected by said beam splitter to converge on said light receiving means.

3. An optical sensor comprising:

a light scanning mechanism which causes light emitted by a light-emitting diode to scan for a to-be-detected object;

a first converging optical system which causes the light emitted by said light-emitting diode to converge on the to-be-detected object; and a second converging optical system which causes the light reflected by said to-be-detected object to converge on light receiving means;

wherein said second converging optical system is located in a reflecting optical path along which the light reflected by the to-be-detected object extends, said reflecting optical path being different from a scanning optical path along which the light emitted by said light-emitting diode extends to the to-be-detected object.

* * * * *